United States Patent
Rupasinghe et al.

(10) Patent No.: US 10,312,993 B2
(45) Date of Patent: Jun. 4, 2019

(54) COOPERATIVE CLUSTERING FOR ENHANCING MU-MASSIVE-MISO-BASED UAV COMMUNICATION

(71) Applicants: Nadisanka Rupasinghe, Raleigh, NC (US); Ismail Guvenc, Miramar, FL (US); Ahmed Salah Ibrahim Mohamed, Miami, FL (US)

(72) Inventors: Nadisanka Rupasinghe, Raleigh, NC (US); Ismail Guvenc, Miramar, FL (US); Ahmed Salah Ibrahim Mohamed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 267 days.

(21) Appl. No.: 15/337,346

(22) Filed: Oct. 28, 2016

(65) Prior Publication Data
US 2017/0126309 A1 May 4, 2017

Related U.S. Application Data

(60) Provisional application No. 62/248,684, filed on Oct. 30, 2015.

(51) Int. Cl.
*H04B 7/185* (2006.01)
*H04B 7/0452* (2017.01)
*B64C 39/02* (2006.01)
*G05D 1/10* (2006.01)

(52) U.S. Cl.
CPC ....... *H04B 7/18506* (2013.01); *B64C 39/024* (2013.01); *G05D 1/104* (2013.01); *H04B 7/0452* (2013.01); *B64C 2201/122* (2013.01)

(58) Field of Classification Search
CPC .............. H04B 7/18506; H04B 7/0452; B64C 39/024; B64C 2201/122; G05D 1/104
See application file for complete search history.

(56) References Cited

U.S. PATENT DOCUMENTS

| | | | |
|---|---|---|---|
| 5,235,320 A * | 8/1993 | Romano | G08B 25/10 340/531 |
| 7,289,812 B1 * | 10/2007 | Roberts | G08G 1/0962 342/350 |
| 8,942,721 B1 * | 1/2015 | Aragon | H04W 64/00 455/404.1 |
| 9,374,678 B2 * | 6/2016 | Gupta | H04W 4/043 |
| 2002/0097184 A1 * | 7/2002 | Mayersak | G01S 3/54 342/458 |

(Continued)

OTHER PUBLICATIONS

Villasenor, "Drones and the future of domestic aviation," Proceedings of the IEEE, Mar. 2014, pp. 235-238, vol. 102, No. 3.
(Continued)

*Primary Examiner* — Dominic E Rego
(74) *Attorney, Agent, or Firm* — Saliwanchik, Lloyd & Eisenschenk

(57) ABSTRACT

Methods, apparatuses, and systems for organizing data delivering unmanned aerial vehicles (UAVs) are provided. Inter-cluster coordinators can organize data delivering unmanned aerial vehicle base stations (UAV-BSs). Various beamforming techniques (e.g., LZFBF and ZFBF) can be incorporated, and the inter-cluster coordinator can operate on a base station that serves as a controlling network node.

17 Claims, 10 Drawing Sheets

(56) References Cited

U.S. PATENT DOCUMENTS

| | | | | |
|---|---|---|---|---|
| 2012/0092130 | A1* | 4/2012 | Chung | G06Q 10/08 340/10.1 |
| 2015/0344136 | A1* | 12/2015 | Dahlstrom | B64C 39/024 701/3 |
| 2016/0068264 | A1* | 3/2016 | Ganesh | G08G 5/0069 701/2 |
| 2017/0098320 | A1* | 4/2017 | Borrelli | G06F 3/012 |

OTHER PUBLICATIONS

Sullivan, "Evolution or revolution? The rise of UAVs," IEEE Technology and Society Magazine, Feb. 2006, pp. 43-49.

Asadpour et al., "Micro aerial vehicle networks: an experimental analysis of challenges and opportunities," IEEE Communications Magazine, Jul. 2014, pp. 141-149, vol. 52, No. 7.

Bekmezci et al., "Flying ad-hoc networks (FANETs): a survey," Ad Hoc Networks, Jan. 8, 2013, pp. 1254-1270, vol. 11, No. 3.

Seitz, "Commercial drone sales set to soar," Investor's Business Daily, Jul. 22, 2015, pp. 1-2, http://news.investors.com/technology/072215-762954-drone-sales-forecast-2015-to-2025-from-tractica.htm.

Richards, "Will internet access via drones ever fly," Wired Magazine, Nov. 2014, pp. 1-4, http://www.wired.com/insights/2014/11/internet-access-drones/.

Yaliniz et al., "Efficient 3-D placement of an aerial base station in next generation cellular networks," arXiv:1603.00300v1 [math.OC], Feb. 26, 2016, pp. 1-5, http://arxiv.org/abs/1603.00300.

Mozaffari et al., "Drone small cells in the clouds: design, deployment and performance analysis," arXiv:1509.01655v1 [cs.IT], Sep. 5, 2015, pp. 1-6, http://arxiv.org/abs/1509.01655.

Mozaffari et al., "Optimal transport theory for power-efficient deployment of unmanned aerial vehicles," arXiv:1602.01532v1 [cs.IT], Feb. 4, 2016, pp. 1-6, http://arxiv.org/abs/1602.01532.

Sharawi et al., "Design and implementation of embedded printed antenna arrays in small UAV wing structures," IEEE Transactions on Antennas and Propagation, Aug. 2010, pp. 2531-2538, vol. 58, No. 8.

Tse et al., Fundamentals of Wireless Communication, 2005, Cambridge University Press, https://web.stanford.edu/~dntse/wireless_book.html.

Wiesel et al., "Zero-forcing precoding and generalized inverses," IEEE Transactions on Signal Processing, Sep. 2008, pp. 4409-4418, vol. 56, No. 9.

Huh et al., "Achieving 'massive MIMO' spectral efficiency with a not-so-large number of antennas," arXiv:1107.3862v2 [cs.IT], Sep. 13, 2011, pp. 1-40, https://arxiv.org/abs/1107.3862.

Jiang et al., "Optimization of UAV heading for the ground-to-air uplink," IEEE Journal on Selected Areas in Communications, Jun. 2012, pp. 993-1005, vol. 30, No. 5.

Merwaday et al., "UAV assisted heterogeneous networks for public safety communications," IEEE Wireless Communications and Networking Conference Workshops, Mar. 2015, pp. 329-334.

Zhan et al., "Wireless relay communications with unmanned aerial vehicles: performance and optimization," IEEE Transactions on Aerospace and Electronic Systems, Jul. 2011, pp. 2068-2085, vol. 47, No. 3.

* cited by examiner

COOPERATIVE CLUSTERING FOR ENHANCING MU-MASSIVE-MISO-BASED UAV COMMUNICATION

CROSS-REFERENCE TO A RELATED APPLICATION

The present application claims the benefit of U.S. Provisional Application Ser. No. 62/248,684, filed Oct. 30, 2015, which is incorporated by reference herein in its entirety, including any figures, tables, and drawings.

GOVERNMENT SUPPORT

The subject invention was made with government support under a research project supported by the National Science Foundation grant number CNS-1453678. The government has certain rights in the invention.

BACKGROUND OF THE INVENTION

Unmanned aerial vehicles (UAVs), such as balloons, quadcopters, and gliders, offer a way to deliver broadband connectivity over large areas. UAVs can transport components for creating a communications network base station (BS) and be fitted with antennae and other communications hardware. A UAV fitted in this manner may be referred to as a UAV-assisted base station (UAV-BS) device.

UAV-BSs can provide a fast and efficient way to deploy a communication network that delivers broadband data rates in low-altitude platforms. Potential applications include delivering temporary (or even long-term) broadband access where it is needed, such as for public safety communications (PSC) after fires, terrorist attacks, or natural disasters. UAV-BSs are well-suited for such PSC scenarios due to their mobility and cost efficiency.

There are challenges in delivering broadband access through UAV-BSs. Such challenges include signal interference, attenuated signals, and pilot contamination. Because of their mobility, UAV-BSs offer possible solutions to these problems that do not exist in traditional antennas having fixed locations. In addition, similar to other methods of wireless data transfer, UAV-BSs may be fitted with multiple antennas that can strategically emit a variety of signals to maximize data transmission efficiency. Therefore, there is always a need for methods, apparatuses, and systems that can optimize the location and signal transmissions of UAV-BSs to obtain higher quality and faster data transfer.

BRIEF SUMMARY OF THE INVENTION

An important opportunity for revolutionizing data communication capabilities in areas where there is no fixed infrastructure is to introduce unmanned aerial vehicles (UAVs), such as balloons, quadcopters, or gliders, for delivering pervasive broadband connectivity. UAVs can transport the components for creating a communications network base station (BS) to make a highly mobile base station unit. For example, UAVs can be fitted with antennas and a communications interface for communicating with a heterogeneous communications network (HetNet) in accordance with wireless air interface standards. UAVs can also execute program instructions to provide control functions. A UAV fitted in this manner can be referred to as a UAV-assisted base station (UAV-BS) device.

UAV-BSs can be a fast and efficient way to deploy a communication network that delivers broadband data rates through low-altitude platforms. UAV-BSs are well-suited for PSC scenarios due to their mobility and self-organization capabilities, which are valuable for quickly delivering broadband connectivity at times and locations where it is most needed, through an agile, low cost, and ubiquitous communication infrastructure. However, this type of network deployment can lead users to experience high interference since there is not much time for proper network planning.

Unmanned aerial vehicles (UAVs) can be used as aerial base stations (BSs) to deliver broadband wireless connectivity during temporary events, at hotspot areas, or after disasters that may destroy existing communication infrastructure. Since UAV-BSs are low power nodes, their efficient placement is important to reap the maximum capacity and coverage benefits from their deployments. By making use of UAV mobility and multi-antenna arrays, it is possible to achieve angular domain user separation with lower feedback requirements. Embodiments of the present invention can identify optimum hovering locations for UAV-BSs equipped with multi-antenna arrays.

Embodiments of the subject invention may help to overcome drawbacks in UAV-based communication systems through the introduction of multi user (MU), massive multiple-input single-output (MISO) communication, or MU-MISO. In some embodiments, a clustering approach to MU-MISO may further enhance MU-MISO-based UAV communication. In certain cases, UAV-BS devices using a clustering approach to MU-MISO may communicate with an inter-cluster coordinator to help adjust the positions of UAV-BS devices to decrease the impact of cluster cross-contamination. The inter-cluster coordinator can operate, for example, on a base station that serves as a controlling network node.

DETAILED DESCRIPTION OF THE INVENTION

Figure 1:
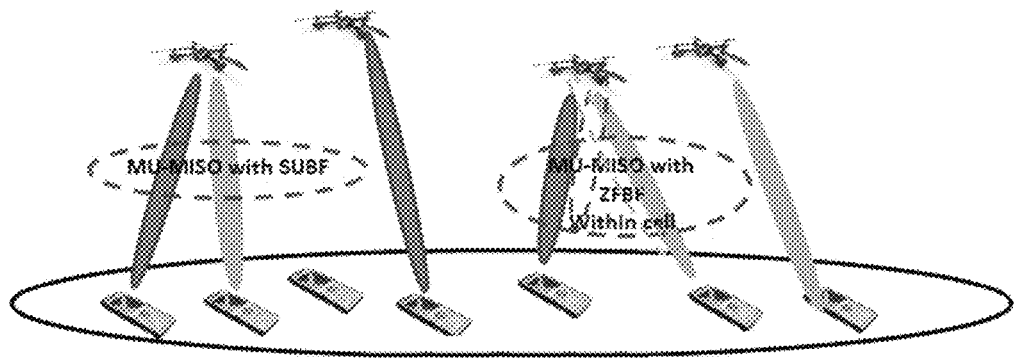
FIG. 1 shows an example network scenario using UAV-BS devices with MU-MIMO and beamforming technologies.

Embodiments of the subject invention may help to overcome drawbacks in UAV-based communication systems through the introduction of multi user (MU), massive multiple-input single-output (MISO) communication, or MU-MISO. In some embodiments, a clustering approach to MU-MISO may further enhance MU-MISO-based UAV communication.

UAV-BS devices using a clustering approach to MU-MISO may communicate with an inter-cluster coordinator to help adjust the positions of UAV-BS devices to decrease the impact of cluster cross pilot-contamination. The inter-cluster coordinator can operate, for example, on a UAV-BS that serves as a controlling network node. The inter-cluster coordinator can also be located within a stationary apparatus and direct the UAV-BSs via wireless communication.

Embodiments of the subject invention can enhance UAV-based communication network deployment in dynamic environments, minimize interference, and maximize network throughput and coverage. Embodiments can provide advantages in a variety of PSC scenarios, as well as in more generalized HetNet scenarios consisting of small-cell base stations such as picocells and femtocells. For example, in a public safety scenario, a large-scale implementation can provide capable PSCs in disaster-affected environments following the aftermath of, e.g., an earthquake, tsunami, or hurricane. In such environments, there is a vital need to maintain broadband, high-speed communication between first responders and victims, whose basic communication mediums may be jeopardized by damaged networking infrastructure. In addition to the aforementioned disaster scenarios, applications can include hot spot communication scenarios. That is, virtually any communications network that may need demand-based reactivity and high data rate connectivity could benefit from this technology.

"Base station devices" refer to devices in the HetNet that provide radio coverage to user equipment (UE) devices. Base station devices can include a number of categories of devices; for example, macrocell base stations (MBS), small cell base stations (SCBS), as well as an unmanned aerial base station (UAV-BS) apparatus. Base station devices can also include microcell, picocell, and femtocell base stations. Generally, what distinguishes an MBS from an SCBS (or smaller BS) is the size of its radio coverage area, which is often a function of the size, height, elevation, and transmission power of the antenna.

Beamforming with low feedback can be effective in UAV-BS scenarios because of the ability of UAV-BS devices to move in all three dimensions. In a network architecture using massive MISO-based communication, highly directional beams can be directed towards the desired user equipment (UE), e.g., mobile phones, tablets, and laptops, so that the interference at other UEs can be reduced.

Using massive MISO-based transmission, it is possible to generate highly directional beams with high gain. As a result, the transmission power from the UAV-BS can be reduced, which will further reduce interference levels in the system. Reduced transmission power also means improved energy efficiency, leading greater UAV-BS operation time. Furthermore, MU-MISO can further enhance system capacity, since the same resources are shared between multiple users.

FIG. 1 shows an example network scenario using UAV-BSs with MU-MISO beamforming technologies. In FIG. 1, a UAV-BS transmits with highly directional beams to attached UEs using massive MU-MISO. Differently shaded/colored beams represent different pilot codes. Each user equipment (UE) is allocated a "pilot code" in order to obtain channel state information (CSI) at the UAV-BS. However, for data transmission, the same resources can be utilized.

An embodiment of the subject invention may use a multiplicity of beamforming techniques. Two possible approaches for MU-MISO are shown in FIG. 1. In single user beamforming (SUBF), the beamforming vector is generated considering only the CSI of the desired user. SUBF is represented with solid lines in FIG. 1. Some embodiments may use zero-forcing beamforming (ZFBF), whereby it is possible to also reduce interference towards other users. In ZFBF, the CSI of the desired user and other users are considered when generating the beamforming vector for a particular transmission. Dashed lines represent ZFBF beams.

Figure 2:
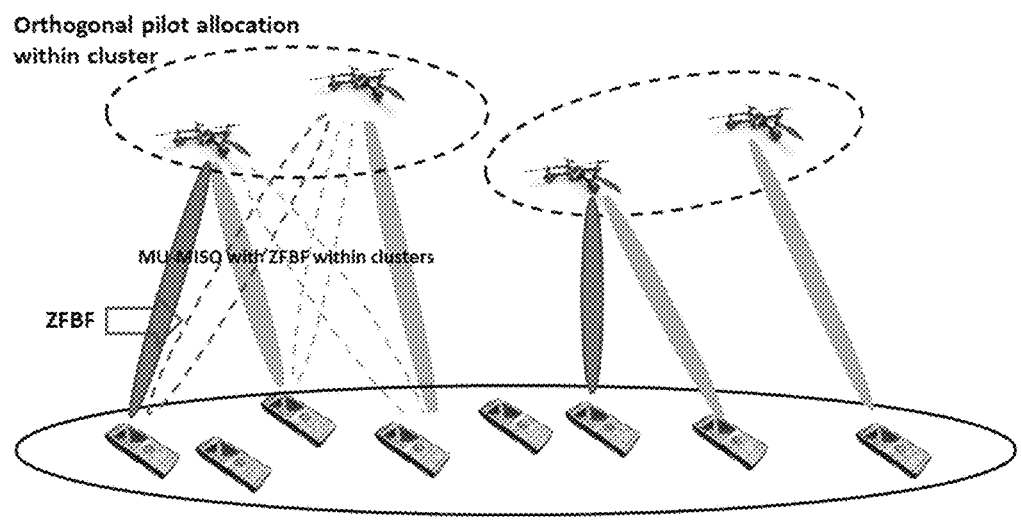
FIG. 2 shows an example network scenario where nearby UAV-BS devices form clusters and utilize zero-forcing beamforming (ZFBF) to manage interference.

Clustering nearby UAV-BS devices can further enhance MU-MISO based UAV communication. FIG. 2 shows an example network scenario where nearby UAV-BS devices are arranged into clusters. The clusters are denoted by the dotted lines drawn around pairs of UAV-BS devices. Within a cluster, the UAV-BSs can cooperate and allocate orthogonal pilot codes. When UAV-BSs can coordinate pilot codes, ZFBF can be effectively achieved within the cluster, further suppressing interference at users.

Figure 3:
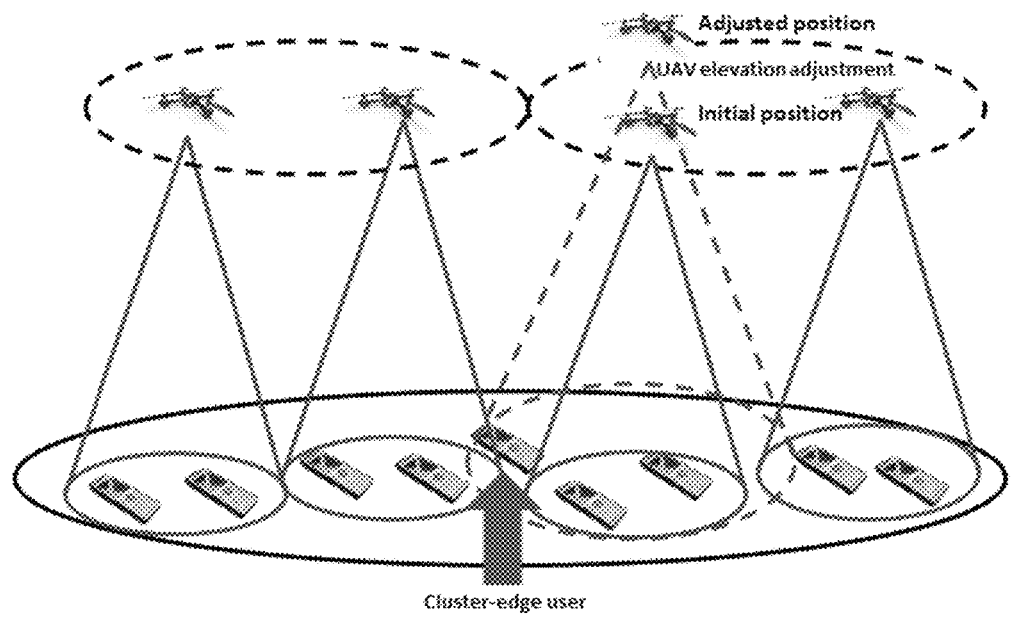
FIG. 3 shows a cluster-edge user equipment (UE) device scenario in which a cluster-edge user problem is solved through elevation adjustment.

However, one issue that arises when using techniques for clustering nearby UAV-BS devices occurs when a UE device is located (or moves) between the coverage boundaries of the existing clusters (the so-called "cluster-edge UE problem"). FIG. 3 shows a cluster-edge UE device scenario. The cluster-edge UE device is denoted by the arrow.

To overcome the cluster-edge UE problem, UAV-BSs can adjust their location (including elevation; i.e., in three dimensions) to include a cluster-edge UE into the cluster. As shown in FIG. 3, a UAV-BS moves from its initial position to an adjusted (e.g., higher) position in order to expand the range of the cluster to the cluster-edge UE.

In certain embodiments, UAV-BS devices using a clustering approach to MU-MISO may communicate with an inter-cluster coordinator to coordinate adjustments to the positions of UAV-BS devices. This can help to decrease the impact of cluster cross-contamination.

One of the main performance-limiting factors in MU-massive MISO based systems is "pilot contamination." As mentioned, pilot codes are used between the UAV-BSs and the UEs in order to obtain CSI. If the same pilot code is allocated to nearby users, the channel CSI information received at the UAV-BS will be corrupted, causing pilot contamination.

Pilot contamination arises in some cases due to the distance range chosen for pilot code reuse. If a pilot code allocated to a UE in a UAV-BS is reused over a shorter distance range, there will be high pilot contamination observed at the UAV-BS. On the other hand, if pilot codes are reused over a longer distance range, inefficiencies may exist with respect to power consumption or other resources.

Figure 4:
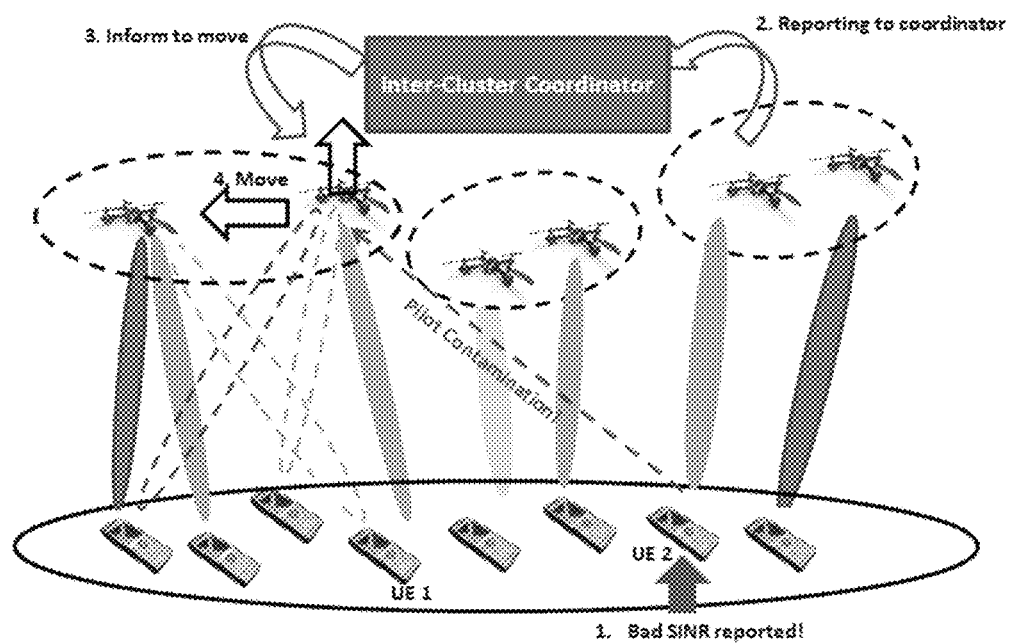
FIG. 4 shows an example network with pilot contamination that can be remedied by an inter-cluster coordinator according to an embodiment of the present invention.

FIG. 4 shows an example network with pilot contamination that may be remedied by an inter-cluster coordinator. In FIG. 4, UE 1 and UE 2, theoretically being served by different UAV-BS clusters, are allocated the same pilot code. As a result, the UAV-BS serving to UE 1 (UAV1) observes high pilot contamination due to UE 2's pilot transmission, depicted by the dotted line labeled "pilot contamination." This may eventually result in the UAV1 forming an undesired beam towards UE 2.

The undesired beam from UAV1 can cause UE 2 to experience bad signal-to-interference-plus-noise ratio (SINR) during data transmission. In some embodiments, UE 2 can report this SINR to its serving UAV-BS (UAV2), which communicates the SINR to an inter-cluster coordinator. The inter-cluster coordinator can operate, for example, on a base station that serves as a controlling network node. A controlling network node can be, e.g., a centrally located or "master" macrocell base station node that operates to control network connectivity across a range of base stations. The inter-cluster coordinator can keep track of which UAV-BS uses which pilot codes. The inter-cluster coordinator can therefore identify which UAV-BS can be moved further from a UE with low SINR (e.g., UE 2) and improve the UE's SINR. As shown in FIG. 4, the inter-cluster coordinator informs the UAV-BS of the proper UE (e.g., UE 1), instructing it to move further away from UE 2, possibly moving it outside the pilot reuse distance range and improving UE 2's SINR.

The term "unmanned aerial vehicle" refers to an autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" (UAVS), or "unmanned aerial system" (UAS) may also be used to refer to a UAV.

Embodiments of the present invention include a novel approach to identifying optimum hovering locations for UAV-BSs to maximize the downlink aggregate rate, by exploiting UAV mobility and multi-antenna techniques. In particular, embodiments of the present invention can achieve angular domain user separation with antenna arrays by moving UAV-BSs to locations where orthogonal beams can be generated at different users. By just knowing the users location, embodiments of the present invention can identify hovering locations for UAV-BSs to have minimum leakage. The locations that are nearest to its intended user can be selected as optimum hovering locations, and transmit (Tx) beamforming can be applied to maximize the SNR. A method according to an embodiment of the present invention can be thought of as a combination of Tx beamforming and linear zero-force beamforming (LZFBF), but without the channel state information (CSI) requirement other than that of the desired user.

Within this application, bold and uppercase letters represent matrices whereas bold and lowercase letters represent vectors. $\|\cdot\|$, $\|\cdot\|$, $(\cdot)^T$, $(\cdot)^*$ represent the absolute value of a complex number, the norm of a vector, transpose operation, and conjugate transpose, respectively. Expectation is denoted by $E(\cdot)$.

System and channel models as applied to embodiments of the present invention will now be discussed. Consider a multi-user (MU) multiple-input-single-output (MISO) system shown in FIG. 6, consisting of UAV-BSs from P= $\{1, 2, \ldots P\}$, and active users from K=$\{1, 2, \ldots K\}$ distributed in the area. UAV-BSs are equipped with Nt×1 uniform linear antenna arrays (ULA) and UEs have a single antenna. The overall transmitted vector $x_n$ (Nt×1 column vector) from nth UAV-BS to its Sn⊆K users can be written vector) from an nth UAV-BS to its Sn⊆K users as (time index is dropped here for simplicity):

$$x_n = \sum_{u \in S_n} \sqrt{P_{Tx}^{un}} f_{un} s_{un}, \quad (1)$$

where $f_{un} \in CN^{N_t \times 1}$ and $s_{un}$ represent normalized beamforming vector ($\|f_{un}\|^2=1$) and scalar data ($E|s_{un}|^2=1$) to the uth user in the nth UAV-BS, respectively. The transmit power to the uth user in nth UAV BS is given by $p^{un}$.

The received signal $y_{un}$ at uth ($\in S_n$) user is given by:

$$y_{un} = \sum_{p=1}^{P} \sum_{k \in S_p} \sqrt{\rho_{u,kp}} h_{up} f_{kp} s_{kp} + n_{un} =$$

$$\sqrt{\rho_{u,un}} h_{un} f_{un} s_{un} + \sum_{k \in S_n, k \neq u} \sqrt{\rho_{u,kn}} h_{un} f_{kn} s_{kn} +$$

$$\sum_{p=1; p \neq n}^{P} \sum_{k \in S_p} \sqrt{\rho_{u,kp}} h_{up} f_{kp} s_{kp} + n_{un}, \quad (2)$$

where $h_{up} \in C^{1 \times N_t}$ is the channel vector from pth UAV-BS to uth user and $n_{un}$ is identically and independently distributed (i.i.d.) complex Gaussian noise from CN $(0, \sigma^2)$. In (2), $\rho_{u,kp}$ represents average received power at the uth user due to the transmission from pth UAV BS to its kth user. This can be written as $$\rho_{u,kp} = P_{Tx}^{kp} + G_{Tx}(\Phi_{up}) + G_{Rx}(\Phi_{up}) - PL(d_{up}), \quad (3)$$

where $G_{Tx}(\Phi_{up})$ and $G_{Rx}(\Phi_{up})$ are the transmitter and receiver gains in dB which are functions of line-of-sight (LoS) angle $\Phi_{up}$ between uth user and pth UAV-BS. Large scale fading in dB is captured through $PL(d_{up})$. As per FIG. 6, $d_{up}$ can be written as:

$$d_{up} = \frac{d_p}{\sin(\Phi_{up})}, \tag{4}$$

where $d_p$ is the altitude of UAV-BS$_p$.

In (2), the first term represents the desired signal term for user u ($\in S_n$). Intra-cell interference at user u within the UAV-BS n is captured through the second term. Finally, the third term represents the inter-cell interference due to simultaneous transmission from the surrounding UAV-BSs.

A MISO narrowband channel model will be considered for performance evaluations, and the channel vector $h_{up}$ (1×$N_t$) can be written as $$h_{up} = \sqrt{N_t} \sum_{m=1}^{N_{ray}} \alpha_{upm} a_t^*(\Phi_{upm}), \tag{5}$$

where $N_{ray}$ and $\alpha_{upm}$ represent a number of propagation paths, and the complex gain of the mth path from pth UAV-BS to uth user, respectively. The vector $a_t(\Phi_{upm})$ is the transmit antenna array response vector for mth path from the pth UAV-BS to uth user with angle-of-departure (AoD) given by $\Phi$. Further, the electrical length of the antenna array (Lt) is defined as:

$$L_t = N_t \times \frac{\gamma}{\lambda_c}, \tag{6}$$

where $\gamma$, and $\lambda_c$ are the inter-element spacing, and wavelength of the carrier frequency $f_c$.

Maximizing the signal power at the intended user would not significantly improve the performance if the network is dominated by interference. On the other hand, for interference suppression, it is necessary to have additional information at the UAV-BSs. For example, the LZFBF technique can suppress interference, but it requires the CSI of all the users in the network, at each UAV-BS. To achieve interference suppression without the requirement of CSI knowledge from other users, mobility of UAV-BSs can be used to formulate the optimum hovering location identification problem as maximizing the SNR at the intended user, given that the interference leakage from a UAV-BS at other users is less than a threshold value. Downlink transmission is therefore a consideration and it will be assumed that UAV-BSs have CSI only for their intended users and they can cooperate with each other to share user location information.

The optimization problem can then be defined as follows:

$$\max_{(y_n, z_n); u \in S_n} SNR_u, \tag{7}$$

$$\text{subject to } L_u \leq \delta,$$

where $SNR_u$, and $(y_n, z_n)$ are the SNR at user u ($\in S_n$), and coordinates of the nth UAV-BS, respectively. $L_u$ represents the interference leakage at other users due to the transmission to user u. Interference leakage threshold is defined here as $\delta$. Let us first analyze SNR at user u and interference leakage $L_u$ to learn how to achieve (7).

The SNR at user u can be given as:

$$SNR_u = \frac{\rho_{u,un}|h_{un}f_{un}|}{\sigma^2}, \tag{8}$$

whereas the interference leakage $L_u$ is given by $$L_u = \sum_{k=1; k \neq u}^{K} \rho_{k,un}|h_{kn}f_{un}|^2. \tag{9}$$

Embodiment of the present invention can take into account Tx beamforming to maximize (8), and the Tx beamforming vector is derived by aligning a beamforming vector along the channel direction $h_{un}$ $$f_{un} = \frac{h_{un}^*}{\|h_{un}\|}. \tag{10}$$

Figure 6:
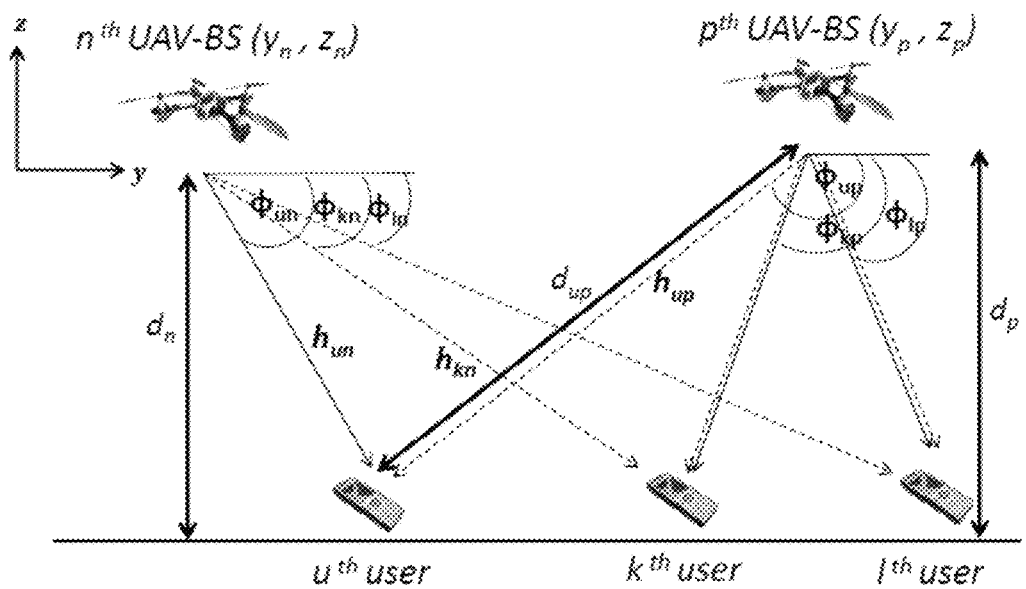
FIG. 6 shows a system model for beamforming to users from a UAV-BSs.

Now, the angle $\theta_{k,un}$ between $h_{kn}$ and $f_{un}$ satisfies [14]:

$$|\cos(\theta_{k,un})| = \left|\frac{\sin(\pi L_t \Omega_{k,un})}{N_t \sin(\pi L_t \Omega_{k,un}/N_t)}\right|, \text{ where} \tag{11}$$

$$\Omega_{k,un} = \cos(\Phi_{un}) - \cos(\Phi_{kn}) \tag{12}$$

is the separation between directional cosines of uth user and kth ($\in S_p$) user (see FIG. 6). By considering Rayleigh flat fading gains, $\alpha_{up} \sim CN(0, 1)$, and dropping index m in (5), we can write $SNR_u$, and $L_u$ using (11) as:

$$SNR_u = \frac{\rho_{u,un}|\alpha_{un}|^2 N_t \left|\frac{\sin(\pi L_t \Omega_{u,un})}{N_t \sin(\pi L_t \Omega_{u,un}/N_t)}\right|^2}{\sigma^2}, \tag{13}$$

$$L_u = \sum_{k=1; k \neq u}^{K} \rho_{k,un}|\alpha_{kn}|^2 N_t \left|\frac{\sin(\pi L_t \Omega_{k,un})}{N_t \sin(\pi L_t \Omega_{k,un}/N_t)}\right|^2. \tag{14}$$

As per (7), SNR maximization at user u can only be achieved if the given constraint, $L_u \leq \delta$ is satisfied. For that, the $|\cos(\theta_{k,un})|$ at kth ($\in S_n$) user in (14) should be zero or closer to zero. For example, if the $|\cos(\theta_{k,un})|$ in (11) is closer to one at user k, the leakage will be higher (scaled based on the path loss) at user k due to the transmission from nth UAV-BS to its uth user. However, if the angle (11) is closer to zero, the interference leakage will be negligible at user k. This is an important observation since unlike conventional fixed BSs, UAV-BSs can make use of its additional degree-of-freedom, mobility, to modify (11) and achieve angular domain user separation with interference leakage satisfying the given constraint in (7). Once the leakage satisfies the given constraint, SNR maximization at user u can be addressed.

As the Tx beamforming vector is selected along the channel direction of the user u, the $|\cos(\theta_{u,un})|$ in the numerator term of (13) is 1. Now, using (3), (4), (11), assuming $G_{Tx}(\Phi_{un})=G_{Rx}(\Phi_{un})=0$ dB, and considering equal power allocation $P_{Tx}$ to all users, signal-to-interference-plus-noise-ratio (SINR) at user u can be given as in (15). Sum capacity will be used as a performance metric in this application and for that, SINR is calculated using (15).

Figure 7:
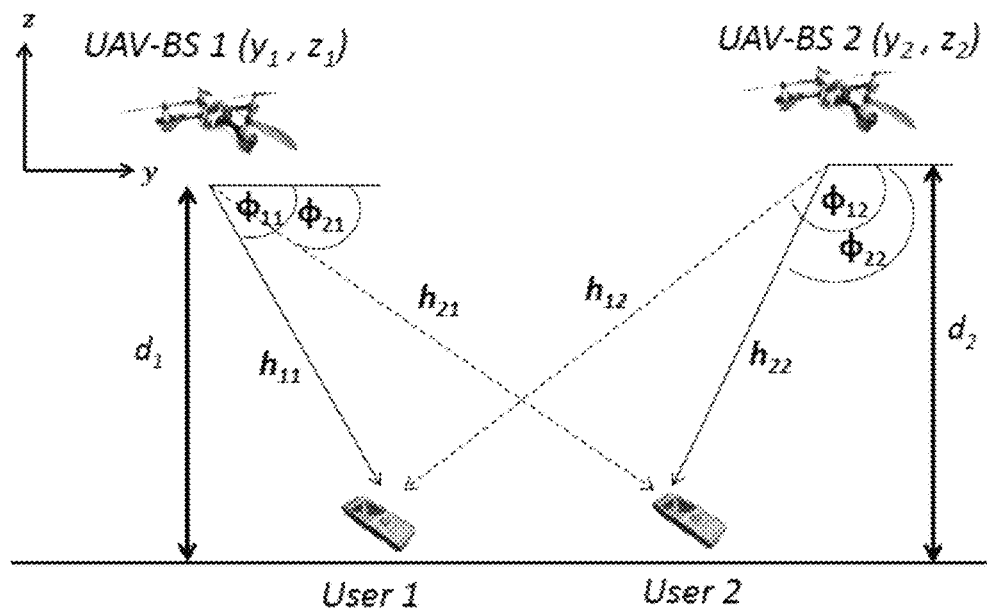
FIG. 7 shows a diagram of a simplified scenario with two UAV-BSs, each with one user attached.

A simplified scenario with only two UAV-BSs, each with one user attached, will be analyzed. This simplified scenario is shown in FIG. 7. With this scenario, (7) can be rewritten as with u, k 1, 2} and n, p $\in$ {1, 2}.

$$\max_{(y_n, z_n); u \in S_n} SNR_u, \quad (16)$$
$$\text{subject to } L_u \leq \delta,$$

Further, (15) can be simplified for user 1 as:

$$SINR_1 = \frac{\frac{P_{Tx}|\alpha_{11}|^2 N_t}{PL(d_1/\sin(\Phi_{11}))}}{\sigma^2 + \frac{P_{Tx}|\alpha_{12}|^2 N_t}{PL(d_2/\sin(\Phi_{12}))} \left|\frac{\sin(\pi L_t \Omega_{1,22})}{N_t \sin(\pi L_t \Omega_{1,22}/N_t)}\right|^2}. \quad (17)$$

$$SINR_u = \frac{\frac{P_{Tx}|\alpha_{un}|^2 N_t}{PL(d_u/\sin(\Phi_{un}))}}{\sigma^2 + \sum_{k \in S_n, k \neq u} \frac{P_{Tx}|\alpha_{un}|^2 N_t}{PL(d_u/\sin(\Phi_{un}))} \left|\frac{\sin(\pi L_t \Omega_{u,kn})}{N_t \sin(\pi L_t \Omega_{u,kn}/N_t)}\right|^2 + \sum_{p=1; p \neq n}^{P} \sum_{k \in S_p} \frac{P_{Tx}|\alpha_{up}|^2 N_t}{PL(d_p/\sin(\Phi_{up}))} \left|\frac{\sin(\pi L_t \Omega_{u,kp})}{N_t \sin(\pi L_t \Omega_{u,kp}/N_t)}\right|^2} \quad (15)$$

A method according to an embodiment of the present invention will now be discussed. The method first deals with minimizing the leakage, and then achieves SNR maximization, by identifying optimum hovering locations. A method according to an embodiment of the present invention can include identifying hovering locations for UAV-BSs which can achieve (16). The intuition behind the method will be discussed followed by its details.

To identify zero leakage hovering locations, the behavior of (11) is considered. In particular, (11) goes to zero whenever the following condition is satisfied:

$$L_t \Omega_{k,un} = q \quad (18)$$

where $\{q \in \mathbb{Z}; \pm 1, \pm 2, \ldots \pm N_t - 1\}$. Here, it is required to restrict q to be less than $N_t$ because $\Omega_{k,un}$ ranges from −2 to 2. The reason why (11) goes to zero when (18) is satisfied is because the angle of the sinusoidal term in the numerator of (11), $\pi L_t \Omega_{k,un}$, becomes an integer multiple of $\pi$ making the sine value equal to zero.

Based on this observation, conditions for directional cosine separation can be identified in (12) to achieve zero interference leakage. Directional cosine separation is of interest because, by changing the hovering locations of UAV-BSs, it is possible to change the directional cosine separation. Using (6) and (18) the condition for directional separation to achieve zero leakage can be given as $$\Omega_{k,un} = \frac{2}{N_t} \times q, \quad (19)$$

for $\gamma=0.5\lambda_c$. From (19) it can be understood that the minimum possible directional cosine separation $\Omega_{k,un}$ to make $\sin(\pi L_t \Omega_{k,un})$ term equal to zero is $2/N_t$. Hence, at a particular hovering location of UAV-BS n, if: 1) the calculated directional cosine separation at user k $(\in S_n)$ is an integer multiple of $2/N_t$, and 2) that integer is less than $N_t - 1$, it can be concluded that, the term $\sin(\pi L_t \Omega_{k,un})$ goes to zero at user k, which in turn will make zero interference leakage at user k due to the transmission of UAV-BS n to user u.

A method for identifying optimum hovering locations for UAV-BSs that can achieve (16) will be discussed. In this method, to identify UAV-BS hovering locations which satisfy the constraint in (16), the condition in (19) can be used for directional cosine separation. First, a hovering grid will be defined with possible movable ranges in y direction and z direction with some predefined resolution (minimum distance between two locations both in y and z directions).

Further, as it is assumed that the user locations are known at UAV-BSs, a range can be selected for the y direction to be symmetric around two users. This can ensure that the directional cosine separation will be symmetric around its maximum value.

Given all the user locations and the hovering grid, the method can first calculate the absolute value of directional cosine separations, at each possible grid point. The absolute value of the directional cosine separation is same for both the UAV-BSs, and there is no need of calculating directional cosine separation for two UAV-BSs separately. Once the directional cosine separation is calculated, it is possible to identify grid points with directional cosine separation satisfying (19) with $q \leq N_t - 1$. However, there can be situations when there are no grid points available with directional cosine separation that are an integer multiple of $2/N_t$, due to insufficient resolution. In that case, the method can select grid points with directional cosine separation closest to an integer multiple of $2/N_t$ which can satisfy the given constraint in (16). In addition, the interference leakage threshold, $\delta$, is defined to overcome the quantization error experience due to this discrete positioning of UAV-BSs within a grid. Rather than defining interference threshold here, $\delta_{ang}$ is defined which sets a threshold for (11) as $|\cos(\theta_{k,un})| \leq \delta_{ang}$. This is because this value can be readily calculated with already available directional cosine information, which directly corresponds to interference leakage, and this can be calculated based on the interference leakage threshold $\delta$.

Once grid points with directional cosine separation satisfying the constraint in (16) are identified ($\hat{y}$, $\hat{z}$), as the second step, out of those grid points, the algorithm assigns grid points to two UAV-BSs having a minimum distance to its intended user. In this manner, the SNR at the intended user can be maximized to achieve (16). This method according to an embodiment of the present invention is summarized in Algorithm 1.

---

Algorithm 1 Optimum locations for UAV-BSs to achieve (16)

1: Input : User locations, hovering grid
2: Step 1:
3: for each grid point, (y, z) do
4:     Identify directional cosine separation ($|\Omega_{k,un}|$) from (12)
5: end for
6: Detect all grid points ($\hat{y}$, $\hat{z}$): $|\Omega_{k,un}|$ satisfy (19)
    and q ≤ $N_t$ − 1
7: if (no grid points detected)
8:     Detect grid points ($\hat{y}$, $\hat{z}$): $|\Omega_{k,un}|$ satisfy constraint in (16)
9: end if
10: Step 2:

| Algorithm 1 Optimum locations for UAV-BSs to achieve (16) |
| --- |
| 11: Calculate distances from all (ŷ, ẑ) to each user |
| 12: Assign (ŷ, ẑ) to UAV-BSs (ŷ$_n$, ẑ$_n$) based on minimum distance to their intended user |

An embodiment according the present invention in which two types of pre-coders that can be deployed in MU-MIMO based UAV communication systems will now be introduced.

Linear single user beamforming (LSUBF) is same as the transmit beamforming (Tx beamforming). In LSUBF, the beamforming vector from nth UAV-BS to its uth user is given by:

$$f_{un} = \frac{h_{un}^*}{\|h_{un}\|}, \quad (24)$$

Figure 12:
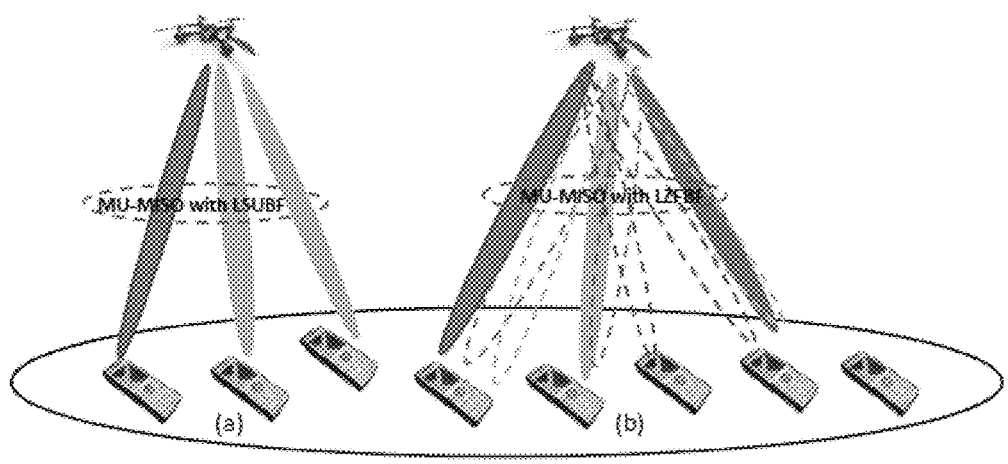
FIG. 12 shows a scenario with one UAV-BS (a) using linear single user beamforming (LSUBF) and one UAV-BS (b) achieving zero force beamforming within the cell.

An LSUBF pre-coder may not take into consideration the elimination of intra-cell or inter-cell interference due to other simultaneous transmissions. An LSUBF beamforming technique is shown in FIG. 12(a).

$SINR_{un}^{SUBF}$ at the uth user in nth UAV-BS can be given as, $$SINR_{un}^{SUBF} = \frac{P_{u,un}}{\sigma^2 + \underbrace{\sum_{k \in S_p; k \neq u} P_{u,kn}}_{\text{Intra-cell interference}} + \underbrace{\sum_{p=1; p \neq n}^{P} \sum_{k \in S_p} P_{u,kp}}_{\text{Inter-cell interference}}}. \quad (25)$$

where $P_{u,kp}$ is the received power at uth user from the transmission to kth $\in S_p$ user and can be given as:

$$P_{u,kp} = \rho_{u,kp} |h_{up} f_{kp}|. \quad (26)$$

In contrast to LSUBF, linear zero-force beamforming (LZFBF) takes into consideration the elimination of interference leakage at non-intended users. The beamforming matrix, $F_n^{ZF}$ for LZFBF can be given as follows:

$$F_n^{ZF} = H_n^* [H_n(H_n)^*]^{-1}. \quad (27)$$

where $H_n \in C^{K \times N_t}$ should be a full row-rank matrix. $F_n$ is obtained using Moore-Penrose pseudo-inverse of $H_n$.

For defining $H_n$, two options can be considered; 1) intra-cell interference suppression, and 2) inter-cell interference suppression. For intra-cell interference suppression, only the users within UAV-BSn is captured in $H_n$ and can be defined as:

$$H_n = [h_{1n} \, h_{2n} \ldots h_{|S_n|_c n}]^T, \quad (28)$$

where $|S_n|_c$ represents the cardinality of set $S_n$. Then, $f_{un}$ can be generated by normalizing the uth column of $F_n^{ZF}$ as:

$$f_{un} = \frac{[F_n]_k}{\|[F_n]_k\|}, \quad (29)$$

SINR $SINR_{un}^{ZF-intra}$ at the uth user in nth UAV-BS can be given as, $$SINR_{un}^{ZF-intra} = \frac{P_{u,un}}{\sigma^2 + \underbrace{\sum_{p=1; p \neq n}^{P} \sum_{k \in S_p} P_{u,kp}}_{\text{Inter-cell interference}}}. \quad (30)$$

Note here that the second term in the denominator of (25) disappears due to LZFBF within the cell.

This intra-cell interference suppression scenario is shown in FIG. 12(b), where the solid beams represent desired beams and the dashed beams represent the null beams.

Figure 13:
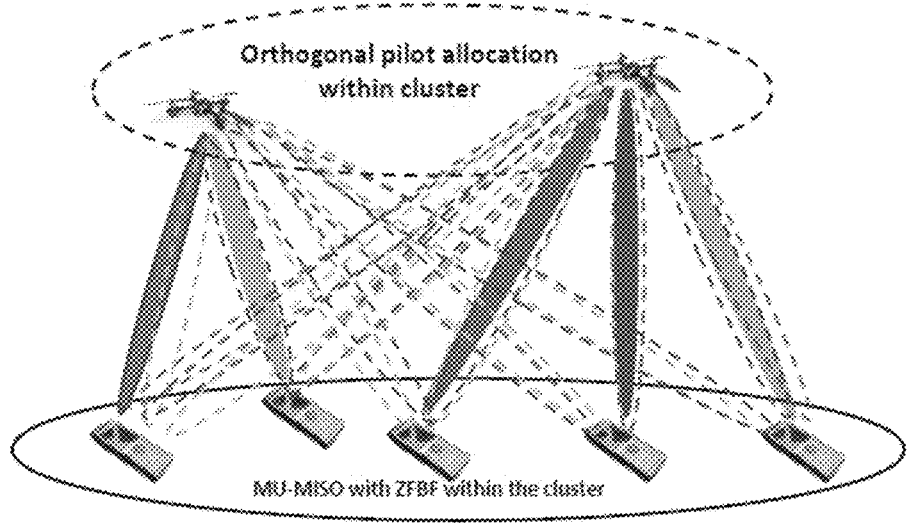
FIG. 13 is a diagram showing two UAV-BSs within a single cluster.

For inter-cell interference suppression, UAV-BSs can be clustered as shown in FIG. 13. Within each cluster, users are allocated with orthogonal pilot codes. Hence, CSI can be calculated at all the UAV-BSs for all the users within the cluster.

Let's assume two UAV-BSs {n, p} are in cluster $Cl_i$ as shown in FIG. 13 and there are Cl number of the clusters. Then, $H_{i,n}$ at nth UAV-BS in ith cluster can be given as follows:

$$H_{i,n} = [\underbrace{h_{1n} \, h_{2n} \, \ldots \, h_{|S_n|_c n}}_{\text{CSI from own cell}} \mid \underbrace{h_{1n} \, h_{2n} \, \ldots \, h_{|S_p|_c n}}_{\text{CSI of users in pth UAV-BS}}]^T. \quad (31)$$

Now, CSI not only from a UAV-BSs own cell but also from other cells in the cluster are considered when generating the precoding matrix in (27). With $H_{i,n}$, we can calculate $F_n^{ZF}$ as shown in (27) and then determine $f_{un}$ from (29). $SINR_{un}^{ZF-inter}$ for uth UAV-BS can then be given as:

$$SINR_{un}^{ZF-inter} = \frac{P_{u,un}}{\sigma^2 + \underbrace{\sum_{p=1; p \neq n, p}^{P} \sum_{k \in S_p} P_{u,kp}}_{\text{Interference from other clusters}}}. \quad (32)$$

With UAV clustered approach, inter-cell interference can be reduced. Hence, based on the number of UAV-BSs within a cluster, achievable performance can be further enhanced. However, UAV-BSs have to cooperate with each other to achieve these benefits.

The application will now discuss uplink pilot transmission of a multi-user (MU) single-input-multiple-output (SIMO) system, consisting of P={1, 2, ... P} UAV-BSs, and K={1, 2, ... K} active users distributed in the area. UAV-BSs are equipped with Nr×1 uniform linear antenna arrays (ULA) and UEs having a single antenna.

Evaluating a SIMO narrowband channel model, the channel vector $h_{up}$ (N$_r$×1) can be written as $$h_{up} = \sqrt{N_r} \sum_{m=1}^{N_{ray}} \alpha_{upm} a_r(\Phi_{upm}), \quad (33)$$

where $N_{ray}$ and $\alpha_{upm}$ represent the number of propagation paths, and the complex gain of the mth path from uth user to pth UAV-BS, respectively. The vector $a_r(\Phi_{upm})$ is the received antenna array response vector for the mth path from the uth user to pth UAV-BS with angle-of-arrival (AoA) given by $\Phi_{upm}$. Further, the electrical length of the antenna array ($L_r$) at a UAV-BS is defined as:

$$L_r = N_r \times \frac{\gamma}{\lambda_c}, \quad (34)$$

where γ, and λc are the inter-element spacing, and wavelength of the carrier frequency $f_c$. A strong line-of-sight (LoS) path can be assumed between each user and UAV-BSs. This is a reasonable assumption since UAV-BSs usually hover several hundred meters above the user location and there is a high probability of having a LoS path. A narrowband distance dependent propagation model will be considered for the following formulations.

Figure 18:
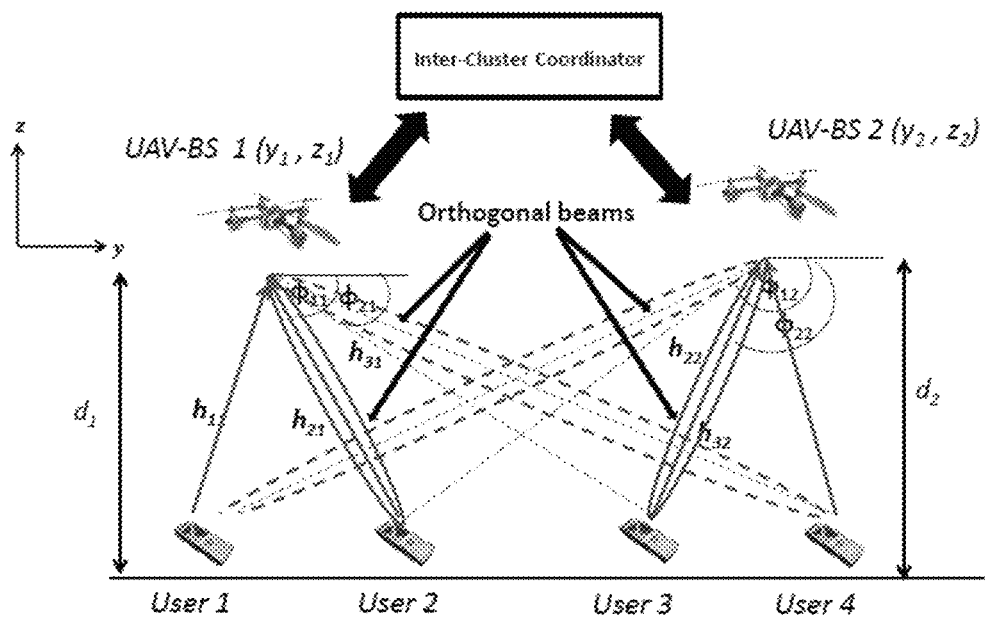
FIG. 18 shows a diagram with two clusters, each with a single UAV-BS.

Methods for utilizing an inter-cluster coordinator to overcome a pilot contamination problem will now be discussed. FIG. 18 shows an example scenario with two clusters in which each cluster has a single UAV-BS. Both clusters are connected to the inter-cluster coordinator. In this discussion, it will be assumed there are enough orthogonal pilot resources to allocate within each cluster. However, the same set of pilot resources can be reused in all the clusters. This assumption is reasonable since UAV based communication networks can be used during emergency situations, when there is no proper planning on how to allocate pilot resources among UAV-BSs. For this reason, there can be significant pilot contamination in UAV based communication networks unless other actions are taken. In this situation, an inter-cluster coordinator can act as a mediator between clusters and provide an angular domain separation based solution for pilot contamination problems. In particular, the users with the same pilot resources can be separated in angular domain, if necessary, by moving UAV-BSs to achieve satisfactory angular separation between those users. The inter-cluster coordinator can be responsible for identifying users that will share the same pilot resources, and necessary hovering alterations for UAV-BSs.

A method according to an embodiment of the present invention includes first grouping users that have angular separation from all UAV-BSs based on an orthonormal basis defined for each UAV-BS. One possible basis is:

$$S_r = \left\{ e_r(0), e_r\left(\frac{1}{L_r}\right) \ldots , e_r\left(\frac{n_r - 1}{L_r}\right) \right\}, \quad (35)$$

Where (k−1) th basis vector can be given as, $$e_r\left(\frac{k}{L_r}\right) = \frac{1}{\sqrt{N_r}} \left[1, \exp\left(-j2\pi \frac{\gamma}{\lambda_c} \frac{k}{L_r}\right), \exp\left(-j2\pi 2 \frac{\gamma}{\lambda_c} \frac{k}{L_r}\right), \ldots \exp\left(-j2\pi(N_r - 1) \frac{\gamma}{\lambda_c} \frac{k}{L_r}\right)\right]^T. \quad (36)$$

| Algorithm 2 Inter-cluster coordinator based pilot allocation |
|---|
| 1: Input : User, UAV-BS locations, available pilot resources |
| 2: Identify AoA info. for all users at each UAV-BS |
| 3: Identify which users can be grouped together |
|    If necessary, inform selected UAV-BSs to alter hovering locations |
| 4: Allocate orthogonal pilot resources among different groups |
| 5: Inform UAV-BSs about pilot allocation for each group along with corresponding basis for each group and basis vector to consider for capturing desired user channel in that group |

It is possible to define different bases similar to (35) by keeping the directional cosine separation between two basis vectors $$\frac{k}{L_r},$$

where k=1, . . . , $N_r$−1 UAV mobility can be utilized as an extra degree of freedom in this process to achieve enough angular separation between particular users. Users in the same group can be separated in the angular domain. By determining the location information of UAV-BSs and users (AoA information can readily be calculated with this information), an inter-cluster coordinator can identify user grouping. When it is necessary to alter the hovering locations of UAV-BSs to achieve user orthogonality in the angular domain, the inter-cluster coordinator can direct the UAV-BSs to change their hovering location. Once user grouping is completed, orthogonal pilot resources for each of these groups can be assigned. Within the same group, user separation is achieved in the angular domain whereas between different groups the user separation is in the frequency domain with orthogonal pilot resources. Pilot allocation information can include which pilot resources should be allocated to which user. Once user grouping is completed, the inter-cluster coordinator can provide this information to UAV-BSs.

The basis for each group can include orthonormal vectors (beams). Each of these vectors represents a particular angular direction. If any two vectors from the basis are considered, their angular directions are not overlapping. In other words, they are orthogonal in the angular domain. That is why it is possible to separate users that fall into different angular directions represented by these vectors (signals transmitted to these users do not interfere with each other). Embodiments of the present invention make use of this fact. Based on the user and UAV-BS locations, the inter-cluster coordinator can identify which users can be grouped together such that they can be placed under orthogonal beams defined by basis vectors.

Explaining step 5 of algorithm 2, a user channel is the propagation path between a user and the UAV-BS. It undergoes fading (large scale fading and small scale fading), making the channel vary over time and frequency. Hence, it is important to keep track of channel variation at the UAV-BSs (i.e. to realize downlink (DL) beamforming). That is why embodiments of the present invention can benefit from and incorporate uplink training. Through that, UAV-BSs can derive current channel estimation and use that for upcoming DL transmissions. This UL training process can be performed periodically to ensure that estimation of the channel at the UAV-BS is not outdated. Note here that angle information (AoA, AoD) is usually considered a large scale parameter that does not change as frequently as small scale parameters.

Embodiments of the present invention can model channels as a single-tap Rayleigh channel. This is because there is a high probability of having a strong line-of-sight (LoS) link between UAV-BSs and users, and angular spread at UAV-BSs is smaller due to the UAV-BSs being located at higher altitudes. A user channel can include angular information (LoS direction) and basis vectors that represent particular angular directions. Hence, by looking at LoS direction, it is possible to determine which basis vector is best suited for capturing energy from a user's pilot transmission.

FIG. 18 shows a diagram with two clusters, each with a single UAV-BS. In FIG. 18, user 2 and user 4 are in one group whereas user 1 and user 3 are in another group. As can be seen, users in the same group are allocated the same pilot resource (indicated by same color). It is important to note there is no need to have high angular separation between user 1 and user 2 attached to UAV-BS 1. This is because they are in different groups and are assigned with orthogonal pilot resources.

The pilot resource allocation process can be handled by an inter-cluster coordinator. This is because pilot allocation is a joint approach involving all the nodes in the network. The inter-cluster coordinator is aware of user and UAV-BS locations, and hence it can determine user grouping and, if necessary, can inform certain UAV-BSs to alter their hovering locations to achieve enough angular separation since all the UAV-BSs are connected to the inter-cluster coordinator.

Once user grouping is achieved, this information is passed to UAV-BSs by the inter-cluster coordinator, along with the specific angular basis that should be considered for each orthogonal pilot resource. Further, an inter-cluster coordinator can inform which basis vector the UAV-BS should consider to determine its desired user channel. This approach is summarized in Algorithm 2.

Figure 19:
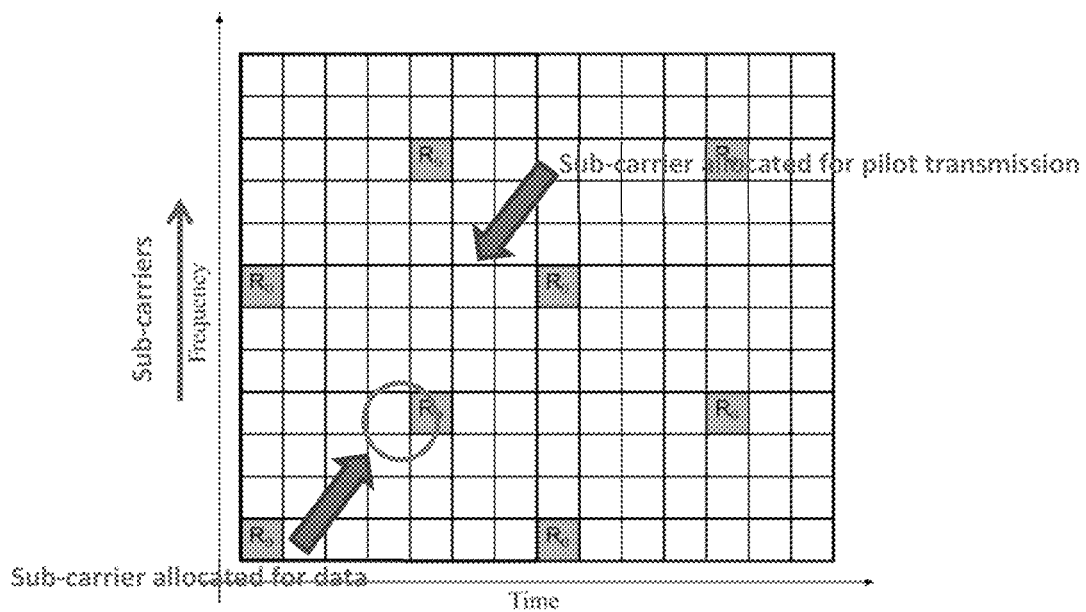
FIG. 19 is a diagram showing data and pilot sub-carrier allocation.

FIG. 19 is a diagram showing data and pilot sub-carrier allocation. Pilot resources are sub-carriers used for channel information. They generally do not carry data, and information transmitted over pilot resources is generally known at the receiver. Users in the same group can be allocated the same set of sub-carriers and orthogonality can be achieved in angular domain, whereas users in different groups can be allocated a different set of sub-carriers and orthogonality can be achieved in the frequency domain. Data and pilot sub-carrier allocation in LTE is shown in FIG. 19.

Figure 5:
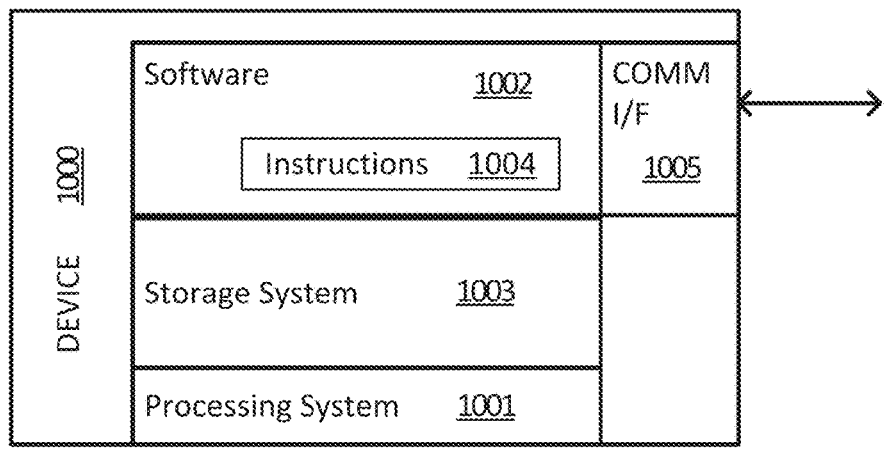
FIG. 5 shows a block diagram illustrating components of a computing device or system used in embodiments of the present invention (e.g., within an inter-cluster coordinator).

Embodiments of the subject invention, including an inter-cluster coordinator, may be implemented, for example, on a device/system as illustrated in FIG. 5. FIG. 5 shows a block diagram of components of a computing device or system (e.g., a BS or UAV-BS) can be used in embodiments of the present invention (e.g., a cluster coordinator). A component of the system, such as an inter-cluster coordinator component (e.g., presented on a controlling node of a network zone), may be implemented as described with respect to device 1000. The device 1000 can itself include one or more computing devices. The hardware can be configured according to any suitable computer architectures such as Symmetric Multi-Processing (SMP) architecture or Non-Uniform Memory Access (NUMA) architecture.

The device 1000 can include a processing system 1001, which may include a processing device such as a central processing unit (CPU) or microprocessor and other circuitry that retrieves and executes software 1002 from the storage system 1003. The processing system 1001 may be implemented within a single processing device but may also be distributed across multiple processing devices or sub-systems that cooperate in executing program instructions.

Examples of the processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

The storage system 1003 may comprise any computer readable storage media readable by processing system 1001 and capable of storing software 1002 including, e.g., processing instructions for cooperative clustering. The storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory, propagated signal. In addition to storage media, in some implementations, the storage system 1003 may also include communication media over which software 1002 may be communicated internally or externally.

The storage system 1003 may be implemented as a single storage device but may also be implemented across multiple storage devices or sub-systems co-located or distributed relative to each other. The storage system 1003 may include additional elements capable of communicating with processing system 1001.

Software 1002 may be implemented in program instructions and, among other functions, may, when executed by device 1000 in general or processing system 1001 in particular, direct the device 1000 or processing system 1001 to operate as described herein for cooperative clustering and MU-MISO. Software 1002 may provide program instructions 1004 that implement methods according to embodiments of the present invention. Software 1002 can be implemented on device 1000 components, programs, agents, or layers that implement in machine-readable processing instructions 1004 the methods and techniques described herein.

In general, software 1002 may, when loaded into processing system 1001 and executed, transform device 1000 overall from a general-purpose computing system into a special-purpose computing system customized to execute methods in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by the processing system 1001. Software 1002 may also include additional processes, programs, or components, such as operating system software and other application software.

The device 1000 may represent any computing system on which software 1002 may be staged and from where software 1002 may be distributed, transported, downloaded, or otherwise provided to yet another computing system for deployment and execution, or yet additional distribution. The device 1000 may also represent other computing systems that may form a necessary or optional part of an operating environment for the disclosed techniques and systems.

A communication interface 1005 may be included, providing communication connections and devices that allow for communication between device 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

The methods and processes described herein can be embodied as code and/or data. The software code and data described herein can be stored on one or more machine-readable media (e.g., computer-readable media), which may include any device or medium that can store code and/or data for use by a computer system. The medium can be non-transitory and does not include electric signals or waves. When a computer system and/or processor reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method for identifying optimum hovering locations for unmanned aerial vehicle base stations (UAV-BSs), the method comprising:
  identifying user locations;
  defining a hovering grid that includes the user locations;
  determining an absolute value of directional cosine separation $|\Omega_{k,un}|$ for each grid point, which is the separation between directional cosines between the uth user and the kth user of the nth UAV-BS;
  detecting all grid points (ŷ, ẑ) with directional cosine separation $$|\Omega_{k,un}| = \frac{2}{N_t} \times q$$

and $$q \leq N_t - 1,$$

wherein $N_t$ is the number of antenna arrays for the nth UAV-BS and q is an integer (e.g., it can take + or − values from 1 to (Nt−1));
  calculating the distance from all grid points (ŷ, ẑ) to each user; and
  assigning grid point (ŷ, ẑ) to the UAV-BSs ($\overline{y_n}, \overline{z_n}$) based on the minimum distance to their intended user.

Embodiment 2

The method of Embodiment 1, wherein the hovering grid is symmetric around two or more users.

Embodiment 3

The method of any of Embodiments 1 to 2, wherein the directional cosine separation for each grid point is determined by $\Omega_{k,un} = \cos \Phi_{un} - \cos \Phi_{kn}$, which is the separation between directional cosines between the uth user and the kth user of the nth UAV-BS.

Embodiment 4

The method of any of Embodiments 1 to 3, wherein the method is executed partially or entirely within one or more of the UAV-BSs.

Embodiment 5

The method of any of Embodiments 1 to 4, wherein the method is executed partially or entirely within a grounded based station.

Embodiment 6

The method of any of Embodiments 1 to 5, further comprising incorporating transmit (Tx) beamforming.

Embodiment 7

The method of any of Embodiments 1 to 6, further comprising incorporating linear zero-force (LZFBF) beamforming.

Embodiment 8

The method of any of Embodiments 1 to 7, wherein the method does not include sending channel state information.

Embodiment 9

The method of any of Embodiments 1 to 7, wherein the method further comprises sending channel state information.

Embodiment 10

The method of any of Embodiments 1 to 9, wherein if no grid points are found in the detecting all grid points $(\hat{y}, \hat{z})$ with directional cosine separation $$|\Omega_{k,un}| = \frac{2}{N_t} \times q$$

and $$q \leq N_t - 1,$$

the method further comprises selecting grid points with directional cosine separation closest to an integer multiple of $$\frac{2}{N_t}$$

that can satisfy the constraints in $$\max_{(y_n, z_n); u \in S_n} SNR_u,$$

subject to $L_u \leq \delta,$

Embodiment 11

The method of any of Embodiments 1 to 10, wherein the method is implemented using an inter-cluster coordinator (which can be, for example, a moving UAV, a stationary apparatus, or it can be part of a UAV-BS that also transmits data).

Embodiment 12

The method of any of Embodiments 1 to 11, wherein the method is implemented on a non-transitory computer readable medium in the form of computer executable instructions that when executed by a processor to perform the method.

Embodiment 13

The method of any of Embodiments 1 to 12, wherein the method further comprises uplink training.

Embodiment 14

The method of any of Embodiments 1 to 13, wherein the method further comprises incorporating linear single user beamforming (LSUBF).

Embodiment 15

The method of any of Embodiments 1 to 14, wherein the method further comprises incorporating zero-forcing beamforming (ZFBF).

Embodiment 16

The method of any of Embodiments 1 to 14, wherein the UAV-BSs allocate orthogonal pilot codes within each cluster.

Embodiment 17

The method of any of Embodiments 1 to 14, wherein the method incorporates millimeter wave communication technology.

Embodiment 101

A method for identifying optimum hovering locations for unmanned aerial vehicle base stations (UAV-BSs), the method comprising:
providing one or more UAV-BSs;
identifying locations of the one or more UAV-BSs;
identifying user locations;
identify available pilot resources;
determining angle-of-arrival (AoA) for each user for each UAV-BS;
identifying which users can be grouped together;
directing UAV-BSs to alter hovering locations; and
sending pilot allocation information to the one or more UAV-BSs with a corresponding basis for each group and a basis vector for capturing a user channel in each group.

Embodiment 102

The method of Embodiment 101, wherein the basis is $$S_r = \left\{ e_r(0), e_r\left(\frac{1}{L_r}\right) \ldots, e_r\left(\frac{n_r - 1}{L_r}\right) \right\}.$$

Embodiment 201

An inter-cluster coordinator for identifying optimum hovering locations for unmanned aerial vehicle base stations (UAV-BSs) comprising a processor, volatile and non-volatile memory, antennas suitable for communicating with the unmanned aerial vehicle base stations (UAV-BSs) and a machine-readable medium with computer executable instructions stored thereon that when executed by a processor perform the method of:
identifying user locations;
defining a hovering grid that includes the user locations;
determining an absolute value of directional cosine separation $|\Omega_{k,un}|$ for each grid point, which is the separation between directional cosines between the uth user and the kth user of the nth UAV-BS;

detecting all grid points (ŷ, ẑ) with directional cosine separation $$|\Omega_{k,un}| = \frac{2}{N_t} \times q$$

and $$q \leq N_t - 1,$$

wherein $N_t$ is the number of uniform linear antenna arrays for the nth UAV-BS and q is an integer;
calculating the distance from all grid points (ŷ, ẑ) to each user; and assigning grid point (ŷ, ẑ) to the UAV-BSs ($\widehat{y_n}, \widehat{z_n}$) based on the minimum distance to their intended user.

Embodiment 301

A method for identifying optimum hovering locations for unmanned aerial vehicle base stations (UAV-BSs), the method comprising:
providing one or more UAV-BSs;
identifying locations of the one or more UAV-BSs;
identifying user locations;
identify available pilot resources;
determining angle-of-arrival (AoA) for each user from each UAV-BS;
identifying which users can be grouped together;
directing UAV-BSs to alter hovering locations to new locations; and
sending pilot allocation information to the one or more UAV-BSs with a corresponding basis for each group and a basis vector for capturing a desired user channel in each group.

Embodiment 302

The method of Embodiment 301, wherein the method is performed by an inter-cluster coordinator.

Embodiment 303

The method of any of Embodiments 301 to 302, wherein the method is performed by a UAV or a UAV-BS.

Embodiment 304

The method of Embodiment 301, wherein the basis for directing UAV-BSs to new locations is $$S_r = \left\{ e_r(0), e_r\left(\frac{1}{L_r}\right) \ldots, e_r\left(\frac{n_r-1}{L_r}\right) \right\}.$$

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Proof of concept experiments for embodiments of the present invention were conducted using computer simulations. In the first part of the analysis, methods according to embodiments of the present invention were validated by comparing their performance with optimum hovering locations identified through exhaustive search. Subsequently, the capacity performance of the methods was analyzed and compared with different beamforming techniques.

Figure 8:
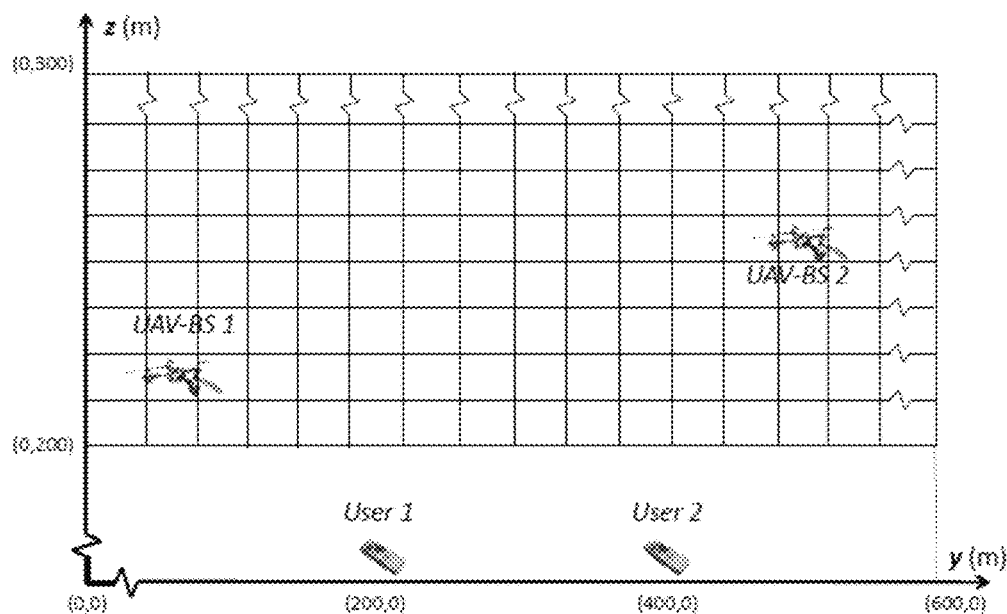
FIG. 8 shows a diagram of how UAV-BSs can move in space around two users.

The simulation setup that was used is shown in FIG. 8. Two users are located in fixed locations (200, 0) m and (400, 0) m, and UAV-BSs can move within a 600×100 m grid with 5 m resolution. The height of the UAV-BSs was restricted to be between 200 m and 300 m, and the horizontal positioning was restricted between 0 m and 600 m. The simulation parameters are summarized in Table I.

Methods according to the present invention were first validated by identifying hovering locations from Algorithm 1, followed by an exhaustive search within the grid, for fixed user locations.

Figure 9:
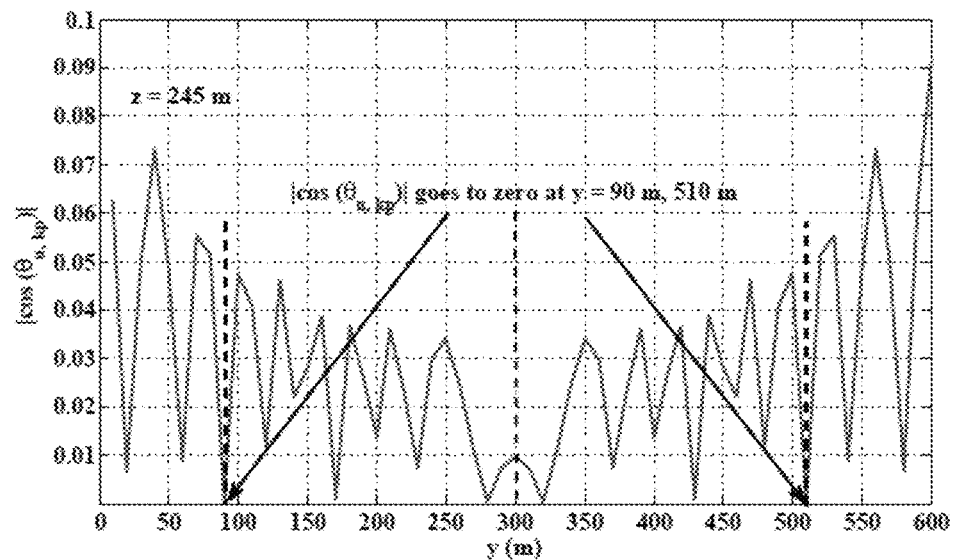
FIG. 9 shows $|\cos(\theta_{u,\,un})|$ variation in the y-direction (z=245 m).

From Algorithm 1, step 1, four grid points, (90, 295) m, (510, 295) m, (90, 245) m, and (510, 245) m could be identified that satisfy the directional cosine separation condition in (19). At all these grid points, directional cosine separation from (12), is 0.375 (q=6 in (18)). As the second step of Algorithm 1, out of those four locations, UAV-BSs are assigned to hover at locations closest to its intended user and, in this case, it is (90, 245) m for UAV-BS 1, and (510, 245) m for UAV-BS 2. In FIG. 9, $|\cos(\theta_{u,kp})|$ variation along the y-direction when z is fixed at an optimal height of 245 m, for both UAV-BSs, is captured. As can be observed, at y=90 m and y=510 m, $\cos(\theta_{u,kp})$ goes to zero. Hence, interference leakage goes to zero at those optimum hovering locations.

Figure 10:
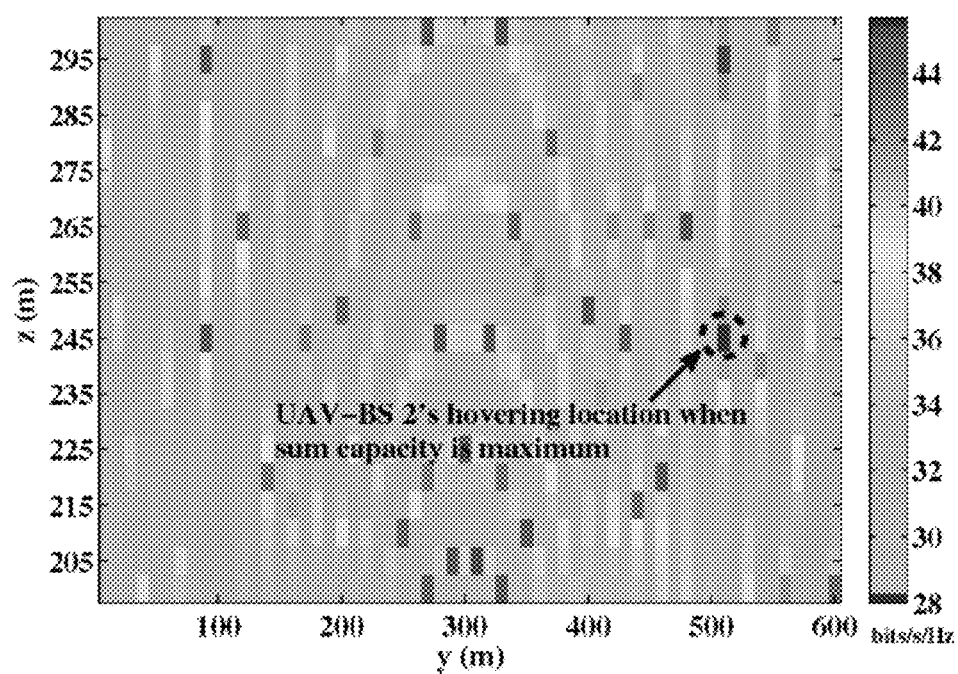
FIG. 10 is a diagram showing the sum capacity heat map with respect to UAV-BS 2's locations within the grid.

Next, to validate the results, an exhaustive search was carried out to identify optimum hovering locations which can maximize sum capacity. FIG. 10 captures the sum capacity heat map with respect to UAV-BS 2's location. To identify the maximum sum-capacity for a given location of UAV-BS 2, UAV-BS 1 is moved within the grid. Then, the maximum sum capacity observed for that particular location of UAV-BS 2 is indicated as the value (sum capacity) of that grid point in FIG. 10. When calculating averaged SINR at each user, $|\alpha_{z,l}|^2$ is considered as 1. The maximum sum capacity, out of all sum capacities at each grid point was observed when UAV-BS 1 and UAV-BS 2 are hovering at (90, 245) m and (510, 245) m, respectively. Embodiments of the present invention were able to determine the same locations, validating the accuracy of the methods.

The sum capacity performance of a method according to an embodiment of the present invention will now be analyzed. In particular, the performance of a method of the present invention was compared with UAV-BSs located randomly within the grid, as shown in FIG. 8. Three different beamforming techniques were evaluated for comparison: 1) Tx beamforming, 2) linear zero-force beamforming (LZFBF), and 3) minimum-mean-square-error (MMSE) beamforming, all with randomly located UAV-BSs. To achieve LZFBF and MMSE beamforming, perfect CSI of both users at each UAV-BS was considered. LZFBF and MMSE precoding vectors at UAV-BS p was then generated with the CSI as follows:

$$F_p^{ZF} = H^*_p[H_p(H_p)^*]^{-1}, \quad (20)$$

$$F_p^{MMSE} = P_{Tx}H^*_p[\sigma^2 I_K + P_{Tx}H_p(H_p)^*]^{-1}, \quad (21)$$

where $F_p^{ZF}$, $F_p^{MMSE}$, and $I_K$ are the ZF, MMSE precoding matrices at UAV-BS p, and K×K identity matrix. $H_p \in \mathbb{C}^{K \times N_t}$ is a full row-rank matrix generated using the CSI of all the users as, $$|H_p = [h_{1p}\ h_{2p} \ldots h_{Kp}]^T. \quad (22)$$

Then, the precoding vector $f_{kp}^{ZF}$ ($f_{kp}^{MMSE}$), from the pth UAV-BS to its kth user can be generated by normalizing the kth column of $F_p^{ZF}$ ($F_p^{MMSE}$), $[F_p^{ZF}]_k$ ($[F_p^{MMSE}]_k$) as $$f_{kp}^{ZF} = \frac{[F_p^{ZF}]_k}{\|[F_p^{ZF}]_k\|}. \quad (23)$$

For the simplified scenario addressed herein, $k \in \{1, 2\}$ and $p \in \{1, 2\}$. However, according to an embodiment of the present invention, CSI of only the intended user is required.

Figure 11:
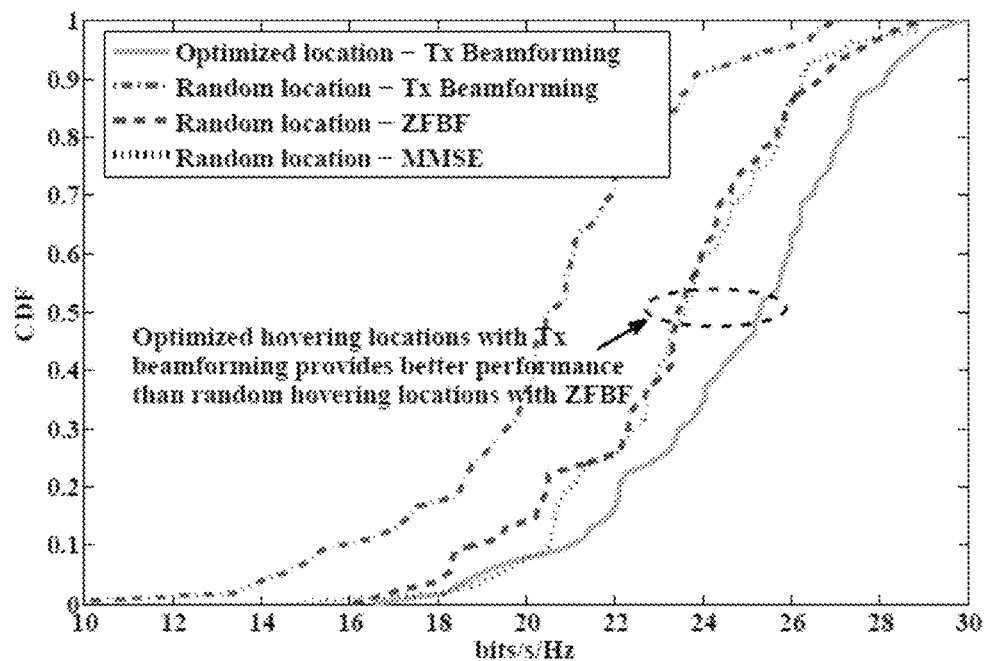
FIG. 11 is a graph of the cumulative distribution functions of sum capacity variation with UAV-BSs hovering at optimized locations and random locations.

In FIG. 11, the cumulative distribution functions (CDFs) of achievable sum capacity with UAV-BSs hovering at locations identified from Algorithm 1, and randomly selected locations (within the grid), are captured. Sum capacity performance when hovering at optimized locations with Tx beamforming is observed to be better compared to that of hovering at random locations with Tx beamforming. This is because Tx beamforming cannot remove the interference leakage. It can only provide a power gain to enhance SNR.

Further, from FIG. 11 it can be observed that embodiments of the present invention can provide better sum capacity performance than that of LZFBF and MMSE when UAV-BSs are hovering at random locations. These beamforming techniques can eliminate leakage by generating null beams towards unintended users. However, embodiments of the present invention can not only eliminate interference leakage to satisfy the constraint in (16), but also maximize the SNR at the desired user by selecting a location closer to the user (see Algorithm 1, Step 2), enhancing the SNR. Further, there will be an additional power gain over LZFBF, since Tx beamforming is used along with the identified optimum hovering locations. The extra degree-of-of-freedom, mobility, inherent in UAV-BSs over conventional BSs, brings all these performance gains to the system.

Example 2

A second proof of concept experiment was done in order to assess the performance of embodiments of the present invention. The experiment included simulation results for fixed UAV-BS locations are discussed. The simulations parameters are summarized in Table I. Two UAV-BSs, each with two users attached, were considered in the simulations.

TABLE I

Simulation parameters.

| Parameter | Value |
|---|---|
| No. of Transmit antennas, $N_t$ | 32 |
| Carrier frequency, $f_c$ | 6 GHz |
| Inter-element spacing, $\gamma$ | 0.5 $\lambda_c$ |
| Tx power, $P_{Tx}$ | 5 dBm |
| Angle threshold, $\delta_{ang}$ | $10^{-4}$ |
| Path loss exponent | 1.98 |

Figure 14:
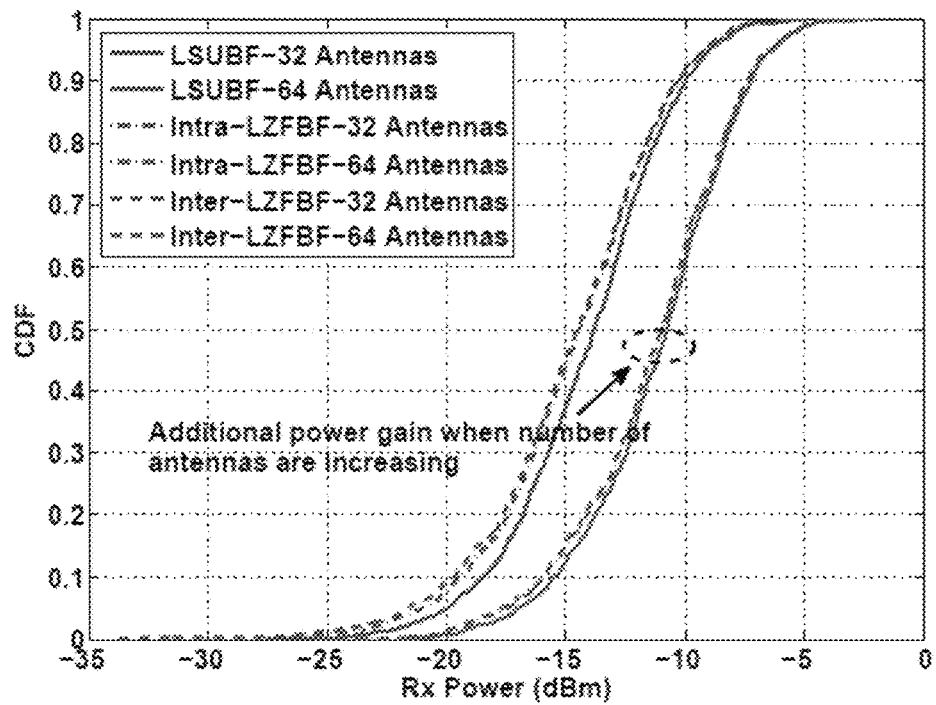
FIG. 14 shows a graph of CDFs of received power distribution at the intended user with different beamforming approaches.

Cumulative distribution functions (CDFs) of the received power at UEs from serving UAV-BSs is shown in FIG. 14. As can be seen, when the number of transmitting antennas increases, more power is received. Further, power gain achieved at the intended user is highest with LSUBF as this aligns the beamforming vector along the channel directions.

Figure 15:
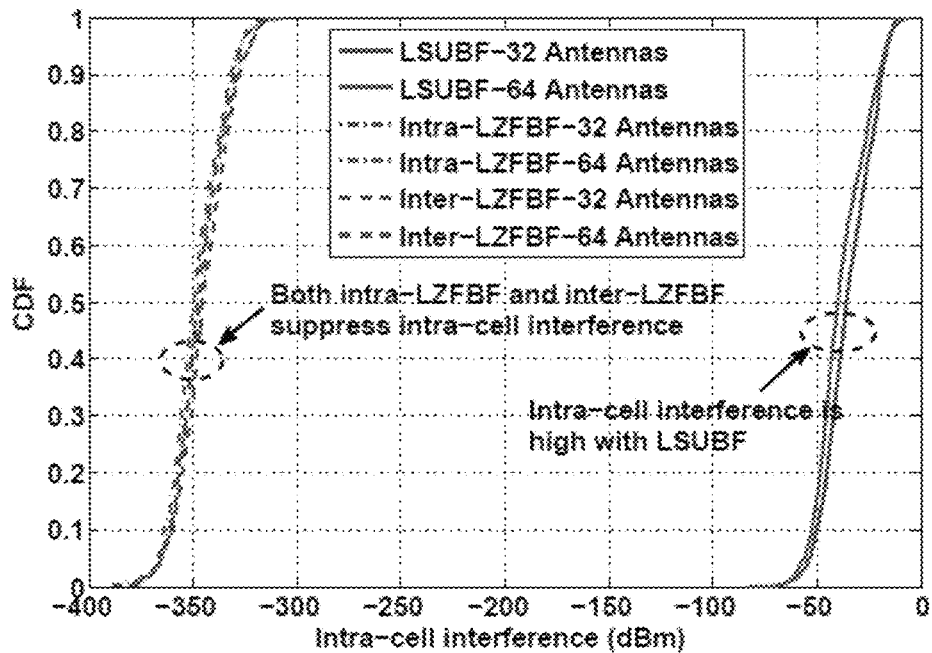
FIG. 15 shows a graph of CDFs of intra-cell interference power distribution with different beamforming approaches.

Intra-cell interference distributions with different beamforming approaches are shown in FIG. 15. As can be observed, the highest intra-cell interference is experienced by LSUBF beam-forming. For both intra and inter cell LZFBF, observed intra-cell interference power is negligible. When generating beamforming vectors for LZFBF, channels of intra-cell users were considered and null beams were generated towards unintended users, making for negligible intra-cell interference power with LZFBF.

Figure 16:
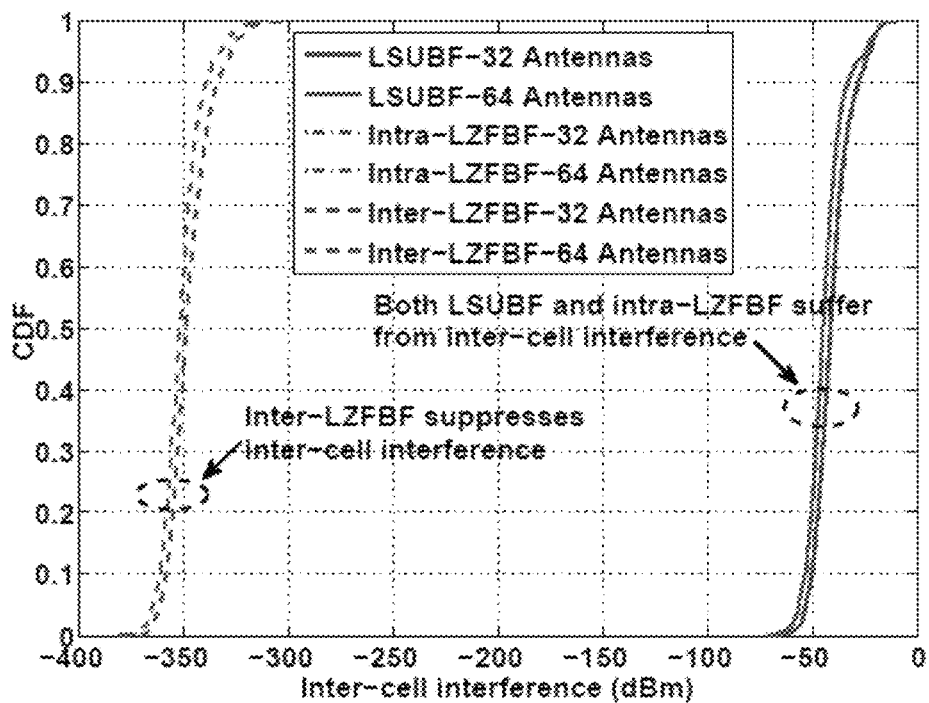
FIG. 16 shows a graph of CDFs of inter-cell interference power distribution with different beamforming approaches.

FIG. 16 captures inter-cell interference distributions with different beamforming approaches. As can be seen, an inter-cell LZFBF beamforming (with UAV-BS clustering) approach experiences negligible inter-cell interference. This is because the beamforming vectors in inter-cell LZFBF beamforming are generated to have null beams towards unintended users within the cluster. Both intra-cell LZFBF and LSUBF experience high inter-cell interference as they do not consider channels of unintended users in other UAV-BSs when generating beamforming vectors. It can also be observed that, when the number of transit antennas increases, inter-cell interference reduces further due to higher directivity with more antennas.

Figure 17:
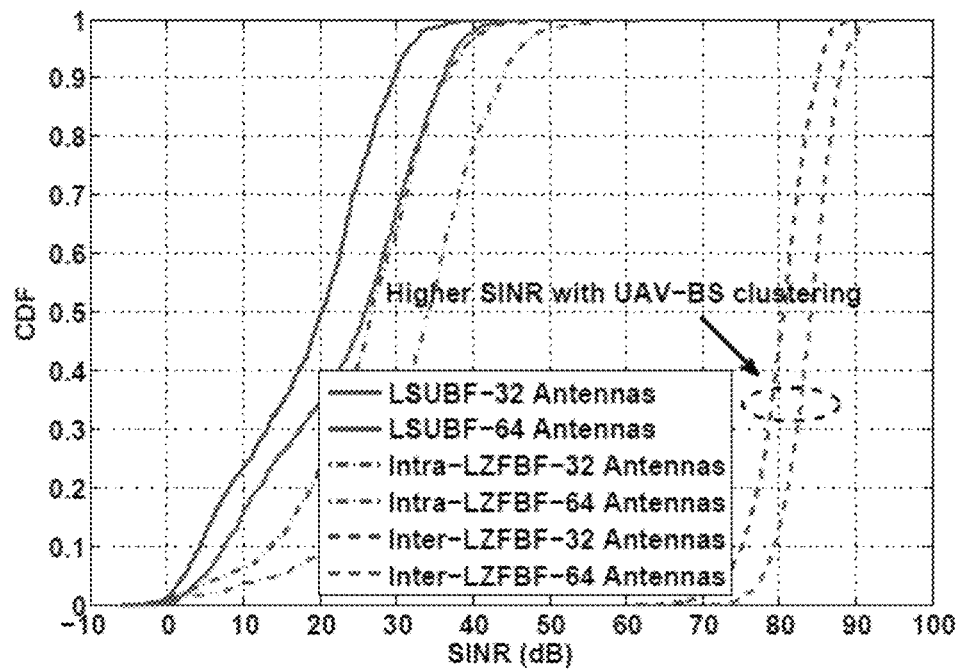
FIG. 17 shows a graph of CDFs of SINR distribution with different beamforming approaches.

CDFs of signal-to-interference-plus-noise ratio (SINR) distribution with different beamforming techniques for UAV-BSs are shown in FIG. 17. As can be observed, an inter-cell ZFBF beamforming approach provides the highest SINR. As explained previously, this is because the inter-cell ZFBF approach can eliminate both intra-cell and inter-cell interference. Further, it can be seen that, with the number of antennas increasing, SINR also increases. This is because, by increasing number of antennas, achievable power gain also increases.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] J. Villasenor, "Drones and the future of domestic aviation," *Proceedings of the IEEE*, vol. 102, no. 3, pp. 235-238, 2014.

[2] J. M. Sullivan, "Revolution or evolution? the rise of the UAVs," in *Proc. Technology and Society*, 2005. *Weapons and Wires: Prevention and Safety in a Time of Fear (ISTAS)*, 2005, pp. 94-101.

[3] M. Asadpour, B. Van den Bergh, D. Giustiniano, K. Hummel, S. Pollin, and B. Plattner, "Micro aerial vehicle networks: An experimental anal-ysis of challenges and opportunities," IEEE *Commun. Mag.*, vol. 52, no. 7, pp. 141-149, 2014.

[4] I. Bekmezci, O. K. Sahingoz, and S. Temel, "Flying ad-hoc networks (fanets): A survey," *Ad Hoc Networks*, vol. 11, no. 3, pp. 1254-1270, 2013.

[5] P. Seitz, "Commercial drone sales set to soar," Investor's Business Daily, July 2015. [Online]. Available: http://news.investors.com/technology/072215-762954-drone-sales-forecast-2015-to-2025-from-tractica.htm

[6] C. Richards, "Will internet access via drones ever fly?" Wired Mag., November 2014. [Online]. Available: http://www.wired.com/insights/2014/11/internet-access-drones/

[7] A. Merwaday and I. Guvenc, "UAV assisted heterogeneous networks for public safety communications," in Proc. IEEE Wireless Commun. Netw. Conf. Workshops (WCNCW), New Orleans, La., March 2015.

[8] R. I. B. Yaliniz, A. El-Keyi, and H. Yanikomeroglu, "Efficient 3-D placement of an aerial base station in next generation cellular networks," arXiv: 1603.00300 [math.OC], February 2016. [Online]. Available: http://arxiv.org/abs/1603.00300

[9] M. Mozaffari, W. Saad, M. Bennis, and M. Debbah, "Drone small cells in the clouds: Design, deployment and performance analysis," in Proc. IEEE Global Commun. Conf. (GLOBECOM), San Diego, Calif. USA, December 2015, pp. 1-6.

[10], "Optimal transport theory for power-efficient deployment of unmanned aerial vehicles," arXiv: 1602.01532 [cs.IT], February 2016. [Online]. Available: http://arxiv.org/abs/1602.01532

[11] M. S. Sharawi, D. N. Aloi, and O. A. Rawashdeh, "Design and implementation of embedded printed antenna arrays in small UAV wing structures," IEEE Trans. Ant. Propag., vol. 58, no. 8, pp. 2531-2538, August 2010.

[12] P. Zhan, K. Yu, and A. L. Swindlehurst, "Wireless relay communications with unmanned aerial vehicles: Performance and optimization," IEEE Trans. Aero. and Elec. Sys., vol. 47, no. 3, pp. 2068-2085, July 2011.

[13] F. Jiang and A. L. Swindlehurst, "Optimization of uav heading for the ground-to-air uplink," IEEE J. Select. Areas in Commun., vol. 30, no. 5, pp. 993-1005, June 2012.

[14] D. Tse and P. Viswanath, Fundamentals of Wireless Communication. Cambridge Univ. Press, 2005.

[15] a. Wiesel, Y. Eldar, and S. Shamami, "Zero-forcing precoding and generalized inverses," IEEE Trans. Sig. Proc., vol. 56, no. 9, September 2008.

[16] A. Wiesel, Y. Eldar, and S. Shamai, "Zero-forcing precoding and generalized inverses," IEEE Trans. on Sig. Proc., vol. 56, no. 9, September 2008.

[17] H. Huh, G. Caire, H. Papadopoulos, and S. Ramprashad, "Achieving "massive mimo" spectral efficiency with a not-so-large number of antennas," IEEE Trans. on Wireless Communi., vol. 11, no. 9, September 2012.

[18] D. Tse and P. Viswanath, Fundamentals of Wireless Communication. Cambridge Univ. Press, 2005.

[19] D. Tse and P. Viswanath, Fundamentals of Wireless Communication. Cambridge Univ. Press, 2005.

What is claimed is:

1. A method for identifying optimum hovering locations for unmanned aerial vehicle base stations (UAV-BSs) communications, the method comprising:
  identifying user locations;
  defining a hovering grid that includes the user locations;
  determining an absolute value of directional cosine separation $|\Omega_{k,un}|$ for each grid point, which is the separation between directional cosines between the uth user and the kth user of the nth UAV-BS;
  detecting all grid points (y,z) with directional cosine separation $|\Omega_{k,un}|=2/N_t \times q$ and $q \leq N_t-1$, wherein $N_t$ is the number of antenna arrays for the nth UAV-BS and q is an integer;
  calculating the distance from all grid points (y,z) to each user; and
  assigning grid point (y,z) to the UAV-BSs $(y_n,z_n)$ based on the minimum distance to their intended user.

2. The method of claim 1, wherein the hovering grid is symmetric around two or more users.

3. The method of claim 1, wherein the directional cosine separation for each grid point is determined by $\Omega_{k,un}=\cos \Phi_{un} - \cos \Phi_{kn}$, which is the separation between directional cosines between the uth user and the kth user of the nth UAV-BS.

4. The method of claim 1, wherein the method is executed partially or entirely within one or more of the UAV-BSs.

5. The method of claim 1, further comprising incorporating transmit (Tx) beamforming.

6. The method of claim 1, further comprising incorporating linear zero-force (LZFBF) beamforming.

7. The method of claim 1, wherein the method does not include sending channel state information.

8. The method of claim 1, wherein if no grid points are found in the detecting all grid points (y,z) with directional cosine separation $|\Omega_{k,un}|=2/N_t \times q$ and $q \leq N_t-1$, the method further comprises selecting grid points with directional cosine separation closest to an integer multiple of $2/N_t$ that can satisfy the constraints in $$\max_{(y_n,z_n); u \in S_n} SNR_u,$$

subject to $L_u \leq \delta$, .

9. The method of claim 1, wherein the method further comprises incorporating linear single user beamforming (LSUBF).

10. The method of claim 1, wherein the method further comprises incorporating zero-forcing beamforming (ZFBF).

11. The method of claim 1, wherein the method includes millimeter wave communication technology.

12. An inter-cluster coordinator for identifying optimum hovering locations for unmanned aerial vehicle base stations (UAV-BSs) comprising a processor, volatile and non-volatile memory, antennas suitable for communicating with the unmanned aerial vehicle base stations (UAV-BSs) and a non-transitory machine-readable medium with computer executable instructions stored thereon that when executed by a processor perform the method of:
  identifying user locations;
  defining a hovering grid that includes the user locations;
  determining an absolute value of directional cosine separation $|\Omega_{k,un}|$ for each grid point, which is the separation between directional cosines between the uth user and the kth user of the nth UAV-BS;
  detecting all grid points (y,z) with directional cosine separation $|\Omega_{k,un}|=2/N_t \times q$ and $q \leq N_t-1$, wherein $N_t$ is the number of uniform linear antenna arrays for the nth UAV-BS and q is an integer;
  calculating the distance from all grid points (y,z) to each user; and
  assigning grid point (y,z) to the UAV-BSs $(y_n,z_n)$ based on the minimum distance to their intended user.

13. The inter-cluster coordinator of claim 12, wherein the inter-cluster coordinator is a UAV-BS.

14. The inter-cluster coordinator of claim 12, wherein the method further comprises transmit (Tx) beamforming.

15. The inter-cluster coordinator of claim 12, wherein the method further comprises linear zero-force (LZFBF) beamforming.

16. The inter-cluster coordinator of claim 12, wherein the method does not include sending channel state information.

17. The inter-cluster coordinator of claim 12, wherein the method includes incorporating millimeter wave communication technology.

* * * * *